(12) United States Patent
Tahara et al.

(10) Patent No.: US 7,551,672 B1
(45) Date of Patent: Jun. 23, 2009

(54) ENCODING SYSTEM AND METHOD, DECODING SYSTEM AND METHOD, MULTIPLEXING APPARATUS AND METHOD, AND DISPLAY SYSTEM AND METHOD

(75) Inventors: Katsumi Tahara, Kanagawa (JP); Yoshihiro Murakami, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/647,620

(22) PCT Filed: Feb. 4, 2000

(86) PCT No.: PCT/JP00/00629

§ 371 (c)(1),
(2), (4) Date: Oct. 3, 2000

(87) PCT Pub. No.: WO00/46995

PCT Pub. Date: Oct. 8, 2000

(30) Foreign Application Priority Data

Feb. 5, 1999 (JP) ................... 11-029375
Feb. 5, 2009 (JP) ................... 11-029376
Feb. 5, 2009 (JP) ................... 11-029377

(51) Int. Cl.
*H04N 7/12* (2006.01)
*H04N 11/02* (2006.01)
(52) U.S. Cl. .................... 375/240.01; 375/240.24
(58) Field of Classification Search ............ 375/240.26, 375/240.16, 240.01, 240.28
See application file for complete search history.

(56) References Cited

U.S. PATENT DOCUMENTS 5,289,190 A 2/1994 Shimoda et al.
5,461,420 A * 10/1995 Yonemitsu et al. ..... 375/240.15

(Continued)

FOREIGN PATENT DOCUMENTS

AU 9664209 2/1997

(Continued)

OTHER PUBLICATIONS

N. Bjork, C., Christopoulos, Transcoder architectures for video coding, IEEE Trans. On Consumer Electronics, vol. 44, No. 1, pp. 88-98, Feb. 1998.

(Continued)

*Primary Examiner*—David Czekaj
(74) *Attorney, Agent, or Firm*—Frommer Lawrence & Haug LLP; William S. Frommer

(57) ABSTRACT

The present invention relates to an encoding system for encoding input video data and a multiplexing system for multiplexing a plurality of encoded streams. More particularly, it proposes a system and method that involve describing, in encoded streams, information on the picture order of input video data, and using the picture order information when generating packetized elementary stream (PES) packets, to prevent delays associated with the PES packet generation.

MPEG encoders generate PTS_count and DTS_count based on the information obtained from the number of fields in the input video data and describe the PTS_count and DTS_count data as picture order information in encoded streams. The packetizers for generating packetized elementary stream take out PTS_count and DTS_count described in the encoded streams, generate presentation time stamps and decoding time stamps based on PTS_count and DTS_count, and add these time stamps as PES header data.

6 Claims, 25 Drawing Sheets

U.S. PATENT DOCUMENTS

| | | | |
|---|---|---|---|
| 5,473,380 A | | 12/1995 | Tahara |
| 5,517,250 A | * | 5/1996 | Hoogenboom et al. .. 375/240.27 |
| 5,544,266 A | | 8/1996 | Koppelmans et al. |
| 5,568,165 A | * | 10/1996 | Kimura ...................... 345/547 |
| 5,612,900 A | * | 3/1997 | Azadegan et al. ........... 709/247 |
| 5,646,693 A | * | 7/1997 | Cismas ....................... 348/441 |
| 5,675,379 A | * | 10/1997 | Kato et al. ..................... 348/97 |
| 5,715,009 A | | 2/1998 | Tahara et al. |
| 5,754,698 A | | 5/1998 | Suzuki et al. |
| 5,771,357 A | | 6/1998 | Kato et al. |
| 5,778,139 A | * | 7/1998 | Kim ............................. 386/81 |
| 5,940,130 A | | 8/1999 | Nilsson et al. |
| 6,088,393 A | | 7/2000 | Knee et al. |
| 6,177,922 B1 | * | 1/2001 | Schiefer et al. ............. 345/698 |
| 6,278,733 B1 | * | 8/2001 | Bennett et al. ............... 375/240 |
| 6,674,801 B1 | * | 1/2004 | Kim ....................... 375/240.26 |
| 6,798,756 B1 | | 9/2004 | Kosugi |

FOREIGN PATENT DOCUMENTS

| | | |
|---|---|---|
| BR | 9603538-2 | 8/1996 |
| CN | 1215288 A | 4/1999 |
| EP | 0 762 772 A2 | 3/1997 |
| EP | 0 881 838 A1 | 12/1998 |
| EP | 0 888 015 | 12/1998 |
| JP | 8-205146 | 8/1996 |
| JP | 8-214296 | 8/1996 |
| JP | 9-121360 | 5/1997 |
| JP | 9 247666 | 9/1997 |
| JP | 9 247670 | 9/1997 |
| JP | 9-307891 | 11/1997 |
| KR | 97-14362 | 3/1997 |
| KR | 1998-087431 | 12/1998 |
| MX | 9603578 | 8/1996 |
| TW | 311321 | 7/1997 |
| WO | WO 98 54899 | 12/1998 |

OTHER PUBLICATIONS

"Proposed SMPTE Standard for Television-MPEG-2 Video Elementary Stream Editing Information" SMPTE Journal, SMPTE Inc. Scarsdale, N.Y, US, vol. 109, No. 2, Feb. 1, 2000, pp. 151-154, XP000913024 ISSN: 0036-1682.

"ITU-T Recommendation H.262, International Standard ISO/IEC 13818.2 MPEG-2 Video. Transmission of Non-Telephone Signals. Information Technology—Generic Coding of Moving Pictures and Associated Audio Information: Video" ITU-T Telecommunication Standardization Sector of ITU, Geneva, CH, Jul. 1, 1995, pp. 1-211, XP000198491.

Information Technology—Generic Coding of Moving Pictures and Associated Audio Information: Systems. Technologies De L'Information—Codage Des Images Animees Et Du Son Associe: Systems International Standard ISO/IEC, XX, XX, vol. 13818-1, Apr. 15, 1996, pp. I-XY,01, XP000667435.

Wilkinson J H; Nakano H: "SDTI-CP: Packaging for Bitstreams" IEE Colloquium Post Production Workstations and Networking, Nov. 25, 1998, XP008098607.

J.H. Wilkinson, H. Nakano: "SDTI-CP: Packaging for Bitstreams" [Online] Jun. 2, 1999 XP002506145 Retrieved from the Internet: URL:http://www.btinternet.com/ {ivemail/publicdocs/pdf/sdti_cppaper.pef> [retrieved on Nov. 28, 2008].

* cited by examiner

FIG. 2A SOURCE VIDEO
FIG. 2B ES
FIG. 2C PES
FIG. 2D DECODED VIDEO (PRESENTATION VIDEO)

VIDEO DATA SUBJECTED TO 3:2 PULL-DOWN 30[Hz]

VIDEO DATA SUBJECTED TO 2:3 PULL-DOWN

ENCODED STREAM
ES
ANCILLARY DATA
Field_ID

FIG. 9A

|  | F1 | F2 | F3 | F4 | F5 | F6 | F7 | F8 | F9 | F10 | F11 | F12 | F13 |
|---|---|---|---|---|---|---|---|---|---|---|---|---|---|
| FRAME NO | 1 | 2 | 3 | 4 | 5 | 6 | 7 | 8 | 9 | 10 | 11 | 12 | 13 |
| PICTURE TYPE | I | B | B | P | B | B | P | B | B | I | B | B | P |
| Repeat_first_field | 1 | 0 | 1 | 0 | 1 | 0 | 1 | 0 | 1 | 0 | 1 | 0 | 1 |
| Top_field_first | 1 | 0 | 0 | 1 | 1 | 0 | 0 | 1 | 1 | 0 | 0 | 1 | 1 |
| FRAME STRUCTURE | ‖ | ‖ | ‖ | ‖ | ‖ | ‖ | ‖ | ‖ | ‖ | ‖ | ‖ | ‖ | ‖ |

FIG. 9B

|  | F1 | F2 | F3 | F4 | F5 | F6 | F7 | F8 | F9 | F10 | F11 | F12 | F13 |
|---|---|---|---|---|---|---|---|---|---|---|---|---|---|
| FRAME NO | 1 | 2 | 3 | 4 | 5 | 6 | 7 | 8 | 9 | 10 | 11 | 12 | 13 |
| PICTURE TYPE | I | B | B | P | B | B | P | B | B | I | B | B | P |
| Repeat_first_field | 1 | 0 | 1 | 0 | 1 | 0 | 1 | 0 | 1 | 0 | 1 | 0 | 1 |
| Top_field_first | 1 | 0 | 0 | 1 | 1 | 0 | 0 | 1 | 1 | 0 | 0 | 1 | 1 |
| FRAME STRUCTURE | ‖ | ‖ | ‖ | ‖ | ‖ | ‖ | ‖ | ‖ | ‖ | ‖ | ‖ | ‖ | ‖ |
| PTS_counter | 0 | 3 | 5 | 8 | 10 | 13 | 15 | 18 | 20 | 23 | 25 | 28 | 30 |

FIG. 9C

|  | F1 | F4 | F2 | F3 | F7 | F5 | F6 | F10 | F8 | F9 | F13 | F11 | F12 |
|---|---|---|---|---|---|---|---|---|---|---|---|---|---|
| FRAME NO | 1 | 4 | 2 | 3 | 7 | 5 | 6 | 10 | 8 | 9 | 13 | 11 | 12 |
| PICTURE TYPE | I | P | B | B | P | B | B | I | B | B | P | B | B |
| Repeat_first_field | 1 | 0 | 0 | 1 | 1 | 1 | 0 | 0 | 0 | 1 | 1 | 1 | 0 |
| Top_field_first | 1 | 1 | 0 | 0 | 0 | 1 | 0 | 0 | 1 | 1 | 1 | 0 | 1 |
| FRAME STRUCTURE | ‖ | ‖ | ‖ | ‖ | ‖ | ‖ | ‖ | ‖ | ‖ | ‖ | ‖ | ‖ | ‖ |
| DTS_counter | 125 | 0 | 3 | 5 | 8 | 10 | 13 | 15 | 18 | 20 | 23 | 25 | 28 |

| video_sequence(){ | No. of bits | Mnemonic |
|---|---|---|
| next_start_code() | | |
| sequence_header() | | |
| sequence_extension() | | |
|   do{ | | |
|     extension_and_user_data(0) | | |
|     do{ | | |
|       if(nextbits()==group_start_code){ | | |
|         group_of_pictures_header() | | |
|         extension_and_user_data(1) | | |
|       } | | |
|       picture_header() | | |
|       picture_coding_extension() | | |
|       extension_and_user_data(2) | | |
|       picture_data() | | |
|     }while((nextbits()==picture_start_code) | | | |
|     (nextbits()==group_start_code)) | | |
|     if(nextbits()!=sequence_end_code){ | | |
|       sequence_header() | | |
|       sequence_extension() | | |
|     } | | |
|   }while(nextbits()!=sequence_end_code) | | |
| sequence_end_code | 32 | bslbf |
| } | | |

FIG. 10

| sequence_header(){ | No. of bits | Mnemonic |
|---|---|---|
| sequence_header_code | 32 | bslbf |
| horizontal_size_value | 12 | uimsbf |
| vertical_size_value | 12 | uimsbf |
| aspect_ratio_information | 4 | uimsbf |
| frame_rate_code | 4 | uimsbf |
| bit_rate_value | 18 | uimsbf |
| marker_bit | 1 | "1" |
| vbv_buffer_size_value | 10 | uimsbf |
| constrained_parameters_flag | 1 | |
| load_intra_quantiser_matrix | 1 | |
| if(load_intra_quantiser_matrix) | | |
| intra_quantiser_matrix [64] | 8*64 | uimsbf |
| load_non_intra_quantiser_matrix | 1 | |
| if(load_non_intra_quantiser_matrix) | | |
| non_intra_quantiser_matrix [64] | 8*64 | uimsbf |
| next_start_code() | | |
| } | | |

FIG. 11

| picture_data(){ | No. of bits | Mnemonic |
|---|---|---|
| do{ | | |
| slice() | | |
| }while(nextbits()==slice_start_code) | | |
| next_start_code() | | |
| } | | |

FIG. 25

| sequence_extention(){ | No. of bits | Mnemonic |
|---|---|---|
| extension_start_code | 32 | bslbf |
| extension_start_code_identifier | 4 | uimsbf |
| profile_and_level_indication | 8 | uimsbf |
| progressive_sequence | 1 | uimsbf |
| chroma_format | 2 | uimsbf |
| horizontal_size_extension | 2 | uimsbf |
| vertical_size_extension | 2 | uimsbf |
| bit_rate_extension | 12 | uimsbf |
| marker_bit | 1 | bslbf |
| vbv_buffer_size_extension | 8 | uimsbf |
| low_delay | 1 | uimsbf |
| frame_rate_extension_n | 2 | unimsbf |
| frame_rate_extension_d | 5 | uimsbf |
| next_start_code() | | |
| } | | |

FIG. 12

| extension_and_user_data(i){ | No. of bits | Mnemonic |
|---|---|---|
| while((i-1)lts()&&(nextbits()-extension_start_oode)) I | | |
| (nextbits()--user_data_start_code)){ | | |
| if(nextbits()==extension_start_code) | | |
| extension_data(i) | | |
| if(nextbits()-user_data_start_code) | | |
| user_data() | | |
| } | | |
| } | | |

FIG. 13

| Syntax | Bits | Mnemonic |
|---|---|---|
| user_data() { | | |
|   user_data_start_code | 32 | |
|   MPEG_ES_Editing_Information(i) { | | |
|   if(i==0) { | | |
|     while(nextbits() != "0000 0000 0000 0000 0000 0001" ) { | | |
|       if(nextbits() == "V-phase" ) | | |
|         V-phase() | | |
|       Else if(nextbits() == "H-phase" ) | | |
|         H-phase() | | |
|     } | | |
|   } | | |
|   Else if(i==2) { | | |
|     while(nextbits() != "0000 0000 0000 0000 0000 0001" ) { | | |
|       if((nextbits() == "Time code1" ) | (nextbits() == "Time code2" )) | | |
|         Time_code() | | |
|       Else if(nextbits() == "Picture Order" ) | | |
|         Picture_order() | | |
|     } | | |
|     while(nextbits() != "0000 0000 0000 0000 0000 0001" ) { | | |
|       if(nextbits() == "Ancillary_data" ) | | |
|         Ancillary_data() | | |
|       Else if(nextbits() == "History data" ) | | |
|         History data() | | |
|     } | | |
|   } | | |
|   if(nextbits() == "User data" ) | | |
|     User_data() | | |
|       Next_start_code() | | |
| } | | |

FIG. 14

| Data_ID | Data_type |
|---|---|
| 00 | FORBIDDEN |
| 01 | V-Phase |
| 02 | H-Phase |
| 03 | Time code 1 |
| 04 | Time code 2 |
| 05 | Picture Order |
| 06 | Video Index |
| 07 | Ancillary data |
| 08 | History data |
| ... | ... |
| 80 | Control flags |
| ... | ... |
| FF | User data |

FIG. 15

| Syntax | Bits | Mnemonic |
|---|---|---|
| V-Phase(){ | | |
|     Data_ID | 8 | bslbf |
|     V-Phase | 16 | uimsbf |
| } | | |

FIG. 16

| Syntax | Bits | Mnemonic |
|---|---|---|
| H-Phase(){ | | |
|     Data_ID | 8 | bslbf |
|     H-Phase | 8 | uimsbf |
| } | | |

FIG. 17

| Syntax | Bits | Mnemonic |
|---|---|---|
| Picture_order(){ | | |
|     Data_ID | 8 | bslbf |
|     DTS_presence | 1 | bslbf |
|     PTS_counter | 7 | uimsbf |
|     If(DTS_presence == "1"){ | | |
|     Marker_bits | 1 | bslbf |
|     DTS_counter | 7 | uimsbf |
|     } | | |
| } | | |

FIG. 20

| Syntax | Bits | Mnemonic |
|---|---|---|
| Time_code(){ | | |
|   Data_ID | 8 | bslbf |
|   Time_code [63..48] | 16 | uimsbf |
|   Marker_bit | 1 | bslbf |
|   Time_code [47..32] | 16 | uimsbf |
|   Marker_bit | 1 | bslbf |
|   Time_code [31..16] | 16 | uimsbf |
|   Marker_bit | 1 | bslbf |
|   Time_code [15..0] | 16 | uimsbf |
|   Marker_bit | 1 | bslbf |
|   Reserved_bits | 4 | bslbf |
| } | | |

FIG. 18

| Syntax | Bits | Mnemonic |
|---|---|---|
| Time_code [63..0]{ | | |
|   Color frame flag | 1 | bslbf |
|   Drop frame flag (NTSC)/unused (PAL) | 1 | bslbf |
|   TV frame tens | 2 | uimsbf |
|   TV frame units | 4 | uimsbf |
|   Field phase (NTSC)/binary group flag 0 (PAL) | 1 | bslbf |
|   TV seconds tens | 3 | uimsbf |
|   TV seconds units | 4 | uimsbf |
|   Binary group flag 0 (NTSC)/binary group flag 2 (PAL) | 1 | bslbf |
|   TV minutes tens | 3 | uimsbf |
|   TV minutes units | 4 | uimsbf |
|   Binary group flag 2 (NTSC)/field phase (PAL) | 1 | bslbf |
|   Binary group flag 1 (NTSC)/binary group flag 1 (PAL) | 1 | bslbf |
|   TV hours tens | 2 | uimsbf |
|   TV hours units | 4 | uimsbf |
|   2nd binary group | 4 | uimsbf |
|   1st binary group | 4 | uimsbf |
|   4th binary group | 4 | uimsbf |
|   3rd binary group | 4 | uimsbf |
|   6th binary group | 4 | uimsbf |
|   5th binary group | 4 | uimsbf |
|   8th binary group | 4 | uimsbf |
|   7th binary group | 4 | uimsbf |
| } | 4 | uimsbf |

FIG. 19

| Syntax | Bits | Mnemonic |
|---|---|---|
| Ancillary_data(){ | | |
|     Data_ID | 8 | bslbf |
|     Field_ID | 2 | bslbf |
|     Line_number | 14 | uimsbf |
|     Ancillary_data_length | 16 | uimsbf |
|     Marker_bits | 1 | bslbf |
|     For(j=0; j<Ancillary_data_length; j++){ | | |
|         Ancillary_data_payload | 22 | uimsbf |
|         Marker_bits | 1 | bslbf |
|     } | | |
|     While(!bytealigned()) | | |
|         Zero_bit | 1 | "0" |
| } | | |

FIG. 21

| group_of_picture_header(){ | No. of bits | Mnemonic |
|---|---|---|
|     group_start_code | 32 | bslbf |
|     time_code | 25 | bslbf |
|     closed_gop | 1 | uimsbf |
|     broken_link | 1 | uimsbf |
|     next_start_code() | | |
| } | | |

FIG. 22

| picture_header(){ | No. of bits | Mnemonic |
|---|---|---|
| picture_start_code | 32 | bslbf |
| temporal_reference | 10 | uimsbf |
| picture_coding_type | 3 | uimsbf |
| vbv_delay | 16 | uimsbf |
| if(picture_coding_type==2 | picture_coding_type==3){ | | |
|     full_pel_forward_vector | 1 | |
|     forward_f_code | 3 | uimsbf |
| } | | |
| if(picture_coding_type==3){ | | |
|     full_pel_backward_vector | 1 | |
|     backward_f_code | 3 | uimsbf |
| } | | |
| while(nextbits()== "1" ){ | | |
|     extra_bit_picture/*with the value "1" */ | 1 | uimsbf |
|     extra_information_picture | 8 | |
| } | | |
| extra_bit_picture/*with the value "0" */ | 1 | uimsbf |
| next_start_code() | | |
| } | | |

FIG. 23

| picture_coding_extension(){ | No. of bits | Mnemonic |
|---|---|---|
| extension_start_code | 32 | bslbf |
| extension_start_code_identifier | 4 | uimsbf |
| f_code [0][0]/*forward horizontal*/ | 4 | uimsbf |
| f_code [0][1]/*forward vertical*/ | 4 | uimsbf |
| f_code [1][0]/*backward horizontal*/ | 4 | uimsbf |
| f_code [1][1]/*backward vertical*/ | 4 | uimsbf |
| intra_dc_precision | 2 | uimsbf |
| picture_structure | 2 | uimsbf |
| top_field_first | 1 | uimsbf |
| frame_pred_frame_dct | 1 | uimsbf |
| concealment_motion_vectors | 1 | uimsbf |
| q_scale_type | 1 | uimsbf |
| intra_vlc_format | 1 | uimsbf |
| alternate_scan | 1 | uimsbf |
| repeat_first_field | 1 | uimsbf |
| chroma_420_type | 1 | uimsbf |
| progressive_frame | 1 | uimsbf |
| composite_display_flag | 1 | uimsbf |
| if(composite_display_flag){ | | |
|     v_axis | 1 | uimsbf |
|     field_sequence | 3 | uimsbf |
|     sub_carrier | 1 | uimsbf |
|     burst_amplitude | 7 | uimsbf |
|     sub_carrier_phase | 8 | uimsbf |
| } | | |
| next_start_code() | | |
| } | | |

FIG. 24

ENCODING SYSTEM AND METHOD, DECODING SYSTEM AND METHOD, MULTIPLEXING APPARATUS AND METHOD, AND DISPLAY SYSTEM AND METHOD

TECHNICAL FIELD

The present invention relates to an encoding system for encoding input video data and a decoding system for decoding encoded streams.

BACKGROUND ART

Recently, in order to compress/encode video data, the MPEG (Moving Picture Experts Group) technology standardized as ISO/IEC 13818 has come into common use at broadcasting stations that produce and broadcast television programs. MPEG is becoming the de facto standard especially for recording video data generated by video cameras or the like, on tape, disks, or other recording media that can be accessed randomly or for transmitting video programs produced at broadcasting stations, via cables or satellites.

The MPEG technology is an encoding technology that can improve compression efficiency by means of predictive coding of pictures. More particularly, the MPEG standard employs a plurality of predictive coding systems that combine intra-frame prediction and inter-frame prediction, and each picture is encoded by means of either of the following picture types: I-picture (Intra Picture), E-picture (Predictive Picture), and B-picture (Bidirectionally Predictive Picture) according to the prediction system. The I-picture, which is not predicted from other pictures, is a picture encoded within the frame. The P-picture is a picture subjected to inter-frame forward predictive coding by a preceding (past) I-picture or P-picture. The B-picture is a picture subjected to bidirectionally predictive coding both by a preceding (past) I-picture or P-picture and by a following (future) I-picture or P-picture.

A multiplexing system for multiplexing a plurality of video programs produced at broadcasting stations will be described first with reference to FIG. 1.

The MPEG encoders 11 to 19 create encoded streams by encoding received source video programs V1 to V9, respectively, according to the MPEG standard described above. Such encoded streams are also known as elementary streams.

The packetizers 21 to 29 receive the elementary streams output from the MPEG encoders 11 to 19, respectively, and packetize them to create packetized elementary streams (PES). The packetizer process will be described in detail later.

Each of the transport stream generation circuits (TS Gen) 31 to 39 creates a transport stream consisting of 188-byte transport stream packets from the packetized elementary streams output from the respective packetizers 21 to 29.

The system target decoder buffers (STD buffers) 41 to 44 receive and buffer the transport streams output from the transport stream generation circuits. The STD buffers, which are fixed-capacity buffers specified by the MPEG standard, are provided for the purpose of simulation to prevent receive buffer from overflowing and underflowing on the MPEG decoder side.

The multiplexing circuit 40 receives a transport stream from each of the system target decoder buffers 41 to 44 and multiplexes the transport streams according to schedule.

Now the packetization by the packetizers 21 to 29 of the multiplexing system described in FIG. 1 as well as the delays produced during the packetization will be described in detail with reference to FIG. 2.

FIG. 2A shows the order of pictures in source video data supplied to the MPEG encoders. This is a typical example in which source video data is encoded as a GOP structure in the form of I, B, B, P, B, B, P, and so on.

FIG. 2B shows the order of pictures in an encoded stream (elementary stream) encoded by an MPEG encoder. Since B-pictures B2 and B3 are predictive-coded from both I-picture I1 and P-picture P4 as described above, the order of pictures in the encoded stream is I, P, B, B, P, B, B, P, and so on.

FIG. 2C shows a packetized elementary stream (PES) generated by a packetizer. Since a packetizer is the circuit that packetizes the encoded streams output from an encoder and adds a PES header to the packets, the order of pictures in the packetized elementary stream is the same as the order of pictures in the encoded stream output from the encoder.

The packetization carried out by packetizers does not take much time. As can be seen by comparing FIG. 2B and FIG. 2C, however, the packetized elementary stream lags behind the elementary stream by four frames. The reason for this delay will be described in detail below.

The MPEG standard described above defines the decoding timing of each picture for an MPEG decoder by the data called a decoding time stamp (DTS), and the display timing of decoded video data by the data called a presentation time stamp (PTS). Therefore, MPEG decoders must decode each picture in an encoded stream with the timing based on the DTS and output the decoded video data with the timing based on the PTS.

To enable such decoding, the MPEG standard requires the PTS and DTS to be specified for each picture when encoded streams are transmitted or multiplexed. Furthermore, the MPEG standard provides that the PTS and DTS information should be described in the PES header. In other words, the packetizer that generates packetized elementary streams must generate the PTS and DTS.

Now the determination of the PTS by the packetizer after the packetizer receives the elementary stream shown in FIG. 2B from an MPEG encoder will be described.

It is easy to determine a PTS for picture I1 received first because it is an I-picture, which is to be presented first. Let's assume that it is assigned a PTS of "1."

The second picture received is a P-picture, P4. As can be seen from the order of pictures in the source video shown in FIG. 2A, P-picture P4 must be displayed after a plurality of B-pictures that follow it. At the time (t5) when the packetizer receives picture P4, however, it does not know how many B-pictures will be transmitted successively after picture P4. Therefore, it is not possible to determine the PTS of picture P4 at the time (t5) when it is received. Thus, the packetizer buffers the first picture I1 and second picture P4. This buffering must be continued until the PTS of picture P4 is determined.

The third and fourth pictures, B2 and B3, are B-pictures, so their PTSs can be determined immediately. That is, the PTS of picture B2 is "2" and the PTS of picture B3 is "3."

The fifth picture, P7, is a P-picture. Only after receiving this P-picture (at t8), the packetizer knows that the second picture, P4, was followed by two successive B-pictures, and can assign the PTS of "4" to picture P4 after receiving P-picture P7 (at t8). In other words, only after receiving P-picture P7 (at t8), the packetizer knows that the GOP structure (I, P, B, B, P, and so on) of the elementary stream consists of two B-pictures sandwiched between an I-picture and P-pictures, and can decide the PTSs for all the pictures.

In order to determine PTSs as described above, the packetizer must buffer the elementary stream received at t4 until t8. In other words, there is a delay of four frames in the process of determining PTSs.

In case of a GOP structure with two B-pictures between an I-picture and P-pictures as shown in FIG. 2, there is a four-frame delay as described above. In case of a GOP structure with four B-pictures between an I-picture and P-pictures, there is a six-frame delay. Thus, if the number of B-pictures existing between an I-picture and P-pictures is denoted as N, there is a delay of (N+2) frames in the PTS determination process.

Besides, there are also problems in designing packetizers. For example, to produce a delay of four frames, four frame buffer memories are sufficient. However, since streams with various GOP structures may be supplied to packetizers as shown in FIG. 1, the number of frame memories must be designed assuming the maximum number of B-pictures that can exist between an I-picture and P-pictures so that any encoded stream of any GOP structure can be accommodated. As an example, if the maximum number of B-pictures is assumed to be "5" as a reasonable number, a multiplexing system for multiplexing nine video programs needs nine packetizers as shown in FIG. 1. This means that a total of 45 frame memories must be provided. Consequently, the problem with implementing such a multiplexing system is the high cost of equipment.

Furthermore, as shown in FIG. 3, the transmission of the video data prepared at a reporting site to individual households involves transmission from the reporting site to the main broadcasting station, transmission within the main broadcasting station, transmission from the main broadcasting station to local stations, transmission from the local stations to the households, etc. All these transmission processes involve generating packetized elementary streams. Consequently, delays are produced in the generation of the packetized elementary streams in the individual transmission processes and accumulated into a large delay.

DISCLOSURE OF THE INVENTION

The present invention relates to an encoding system for encoding input video data and a multiplexing system for multiplexing a plurality of encoded streams. More particularly, it proposes encoding and decoding systems for packetizing encoded streams without delay.

It proposes a system and method that involve describing, in encoded streams, information on the picture order of input video data and using the picture order information when generating packetized elementary stream (PES) packets to prevent delays associated with the PES packet generation.

The MPEG encoder generates PTS_count and DTS_count based on the information obtained from the number of fields in the input video data and describes the PTS_count and DTS_count data as picture order information in encoded streams. The packetizer that generates packetized elementary streams takes out PTS_count and DTS_count described in the encoded streams, generates presentation time stamps and decoding time stamps based on PTS_count and DTS_count, and adds them as PES header data.

An encoding system for encoding input video data generates an elementary stream by encoding input video data, describes in the elementary stream its picture order information, receives the elementary stream, and generates time stamp information about the elementary stream based on the picture order information described in the elementary stream.

An encoding system for encoding input video data generates an elementary stream by encoding input video data, describes in the elementary stream its picture order information, and packetizes the elementary stream based on the picture order information described in the elementary stream.

An encoding system for encoding input video data generates an elementary stream by encoding input video data, multiplexes, in the elementary stream, time stamp information about the decoding and/or presentation of the elementary stream, receives the elementary stream, and performs stream processing for the elementary stream based on the time stamp information described in the elementary stream.

An encoding system for encoding a plurality of input video data generates a plurality of elementary streams by encoding the plurality of input video data, describes, in each of the elementary streams, time stamp information about the decoding and/or presentation of the elementary streams, receives the plurality of elementary streams, and multiplexes the plurality of elementary streams based on the time stamp information added in each elementary stream.

An encoding system for encoding input video data encodes the input video data to generate an elementary stream, generates a packetized elementary stream from the elementary stream, and describes, in the elementary stream, the information needed to generate the time stamp to be described in the header of the packetized elementary stream.

A multiplexing apparatus for multiplexing the plurality of elementary streams generated by encoding a plurality of input video data comprises means for extracting the time stamp information associated with each of the plurality of elementary streams from the plurality of elementary streams and means for multiplexing the plurality of elementary streams based on the time stamp information extracted from each elementary stream.

A decoding system for decoding the encoded stream generated by encoding source video data extracts the decoding time stamps contained in the encoded stream and decodes the encoded stream based on the decoding time stamps, which are information generated based on the number of fields in the source video data.

A display system for generating decoded video data by decoding the encoded stream generated by encoding source video data and for displaying the decoded video data extracts the presentation time stamp contained in the encoded stream, decodes the encoded stream to generate decoded video data, and displays the decoded video data based on the presentation time stamps, which are information generated based on the number of fields in the source video data.

BRIEF DESCRIPTION OF DRAWINGS

FIG. 9 is a schematic diagram showing the structure of each frame.

FIG. 10 is a schematic diagram showing the syntax of a video sequence.

FIG. 11 is a schematic diagram showing the syntax of a sequence header.

FIG. 12 is a schematic diagram showing the syntax of a sequence extension.

FIG. 13 is a schematic diagram showing the syntax of extension and user data.

FIG. 14 is a schematic diagram showing the syntax of user data.

FIG. 15 is a schematic diagram showing the syntax of a data ID.

FIG. 16 is a schematic diagram showing the syntax of V-Phase.

FIG. 17 is a schematic diagram showing the syntax of H-Phase.

FIG. 18 is a schematic diagram showing the syntax of a time code.

FIG. 19 is a schematic diagram showing the syntax of a time code.

FIG. 20 is a schematic diagram showing the syntax of a picture order.

FIG. 21 is a schematic diagram showing the syntax of ancillary data.

FIG. 22 is a schematic diagram showing the syntax of a group of picture header.

FIG. 23 is a schematic diagram showing the syntax of a picture header.

FIG. 24 is a schematic diagram showing the syntax of a picture coding extension.

FIG. 25 is a schematic diagram showing the syntax of picture data.

BEST MODE FOR CARRYING OUT THE INVENTION

Figure 4:
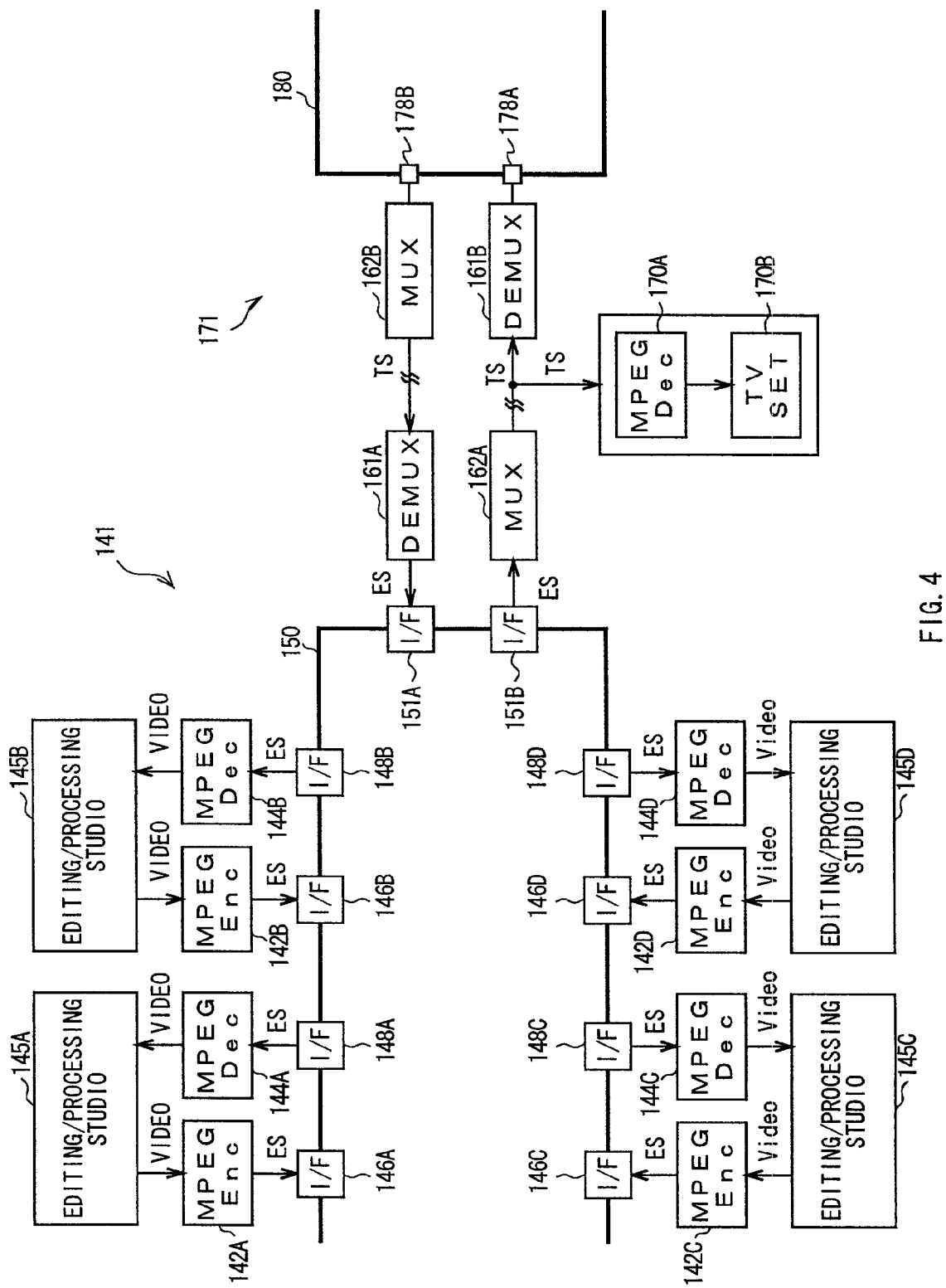
FIG. 4 is a block diagram showing the configuration of the encoding/decoding system according to the present invention.

FIG. 4 shows a broadcasting system consisting of a main broadcasting station 141 and local broadcasting station 171.

The main broadcasting station 141 comprises a plurality of editing/processing studios 145A to 145D, a plurality of MPEG encoders 142A to 142D, a plurality of MPEG decoders 144A to 144D, at least one multiplexer 162A, and at least one demultiplexer 161A. The broadcasting station 141 also includes an SDTI-CP (serial data transfer interface-content package) network 150 defined as SMPTE305M, through which each MPEG encoder, each MPEG decoder, the multiplexer 162A, and the demultiplexer 161A can send and receive elementary streams. SDTI-CP, which is a communications format proposed for transmission of elementary streams of MPEG, is defined as SMPTE305M. The elementary stream transferred over the SDTI-CP network 150 is expressed as ES_over_SDTI-CP.

The editing/processing studios 145A to 145D comprise video servers, video editors, special-effects devices, video switchers. They receive decoded base-band video data from the MPEG decoders, edit it or subject it to image processing, and output it to the MPEG encoders. In other words, editing/processing studios 145A to 145D perform editing and image-processing operations on base-band video signals rather than performing stream processing operations on encoded streams.

The MPEG encoders 142A to 142D receive base-band input video signals from the editing/processing studios 145A to 145D, and encode them according to the MPEG standard described above to generate elementary streams (ES). The elementary streams generated by the MPEG encoders are supplied to either of the MPEG decoders 144A to 144D or the multiplexer 162A through the SDTI-CP network 150.

The MPEG decoders 144A to 144D receive the elementary streams supplied by the MPEG encoders 142A to 142D or the demultiplexer 161A through the SDTI-CP network 150, and decode them according to the MPEG standard. The multiplexer 162A is a circuit for multiplexing the plurality of video programs produced at the main broadcasting station 141 into one transport stream to distribute them to the local broadcasting station 171 or individual households. Specifically, it receives a plurality of elementary streams corresponding to the plurality of video programs through the SDTI-CP network 150, generates packetized elementary streams by packetizing the elementary streams, and then generates transport stream packets from the packetized elementary streams. The multiplexer 162A generates a multiplexed transport stream by multiplexing the transport stream packets generated from the plurality of video programs. The configuration and processes of the multiplexer 162A will be described later.

If the destination of the plurality of video programs is the local broadcasting station 171, the multiplexed transport stream generated by the multiplexer 162A is supplied to the demultiplexer 161B of the local broadcasting station 171 through a network such as an ATM (asynchronous transfer mode) network or satellite line. The local broadcasting station 171 has exactly the same system configuration as the main broadcasting station 141 although they differ in scale, and thus detailed description will be omitted.

If the destination of the plurality of video programs is the local broadcasting station 171, the multiplexed transport stream generated by the multiplexer 162A is supplied to the MPEG decoder 170A contained in the set-top box at each household through a network such as an ATM (asynchronous transfer mode) network or satellite line, and decoded video data is supplied to the TV set.

FIG. 5 illustrates the differences between an elementary stream transmitted via an SDTI-CP network within a broadcasting station and a transport stream transferred via a public network.

Figures 5A, 5B:
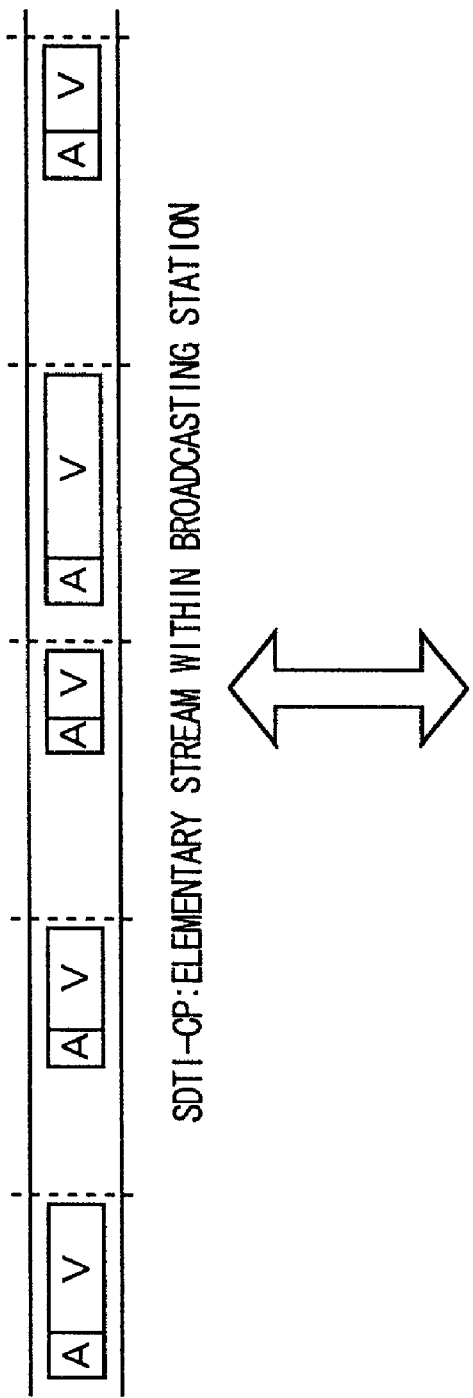
FIG. 5 is a schematic diagram showing an elementary stream and transport stream.

Within the broadcasting station, the elementary stream is transmitted via an SDTI-CP network. The SDTI-CP network 150, which uses a communications format based on the SDI (serial data interface) standardized by SMPTE259M and capable of a transfer rate of 270 Mbps, can transmit elementary streams (ES) in MPEG format directly and is suitable for closed networks such as studios. Specifically, video data "V" and audio data "A" are packed in each frame and the stream can be edited easily along the frame boundaries defined by a frame sync (dotted line) as shown in FIG. 5A.

Between broadcasting stations or over public networks, video data is transmitted in the form of a transport stream. In a transport stream, all contents including video data and audio data are encapsulated into 188-byte packets, as shown in FIG.

5B, to allow data transmission even through a public network with a limited data-transmission capacity. As is the case with elementary streams, "V" indicates a transport stream packet of video data and "A" indicates a transport stream packet of audio data while a blank indicates a null packet.

Now the MPEG encoders 142A to 142D will be described with reference to FIG. 6.

Figure 7A:
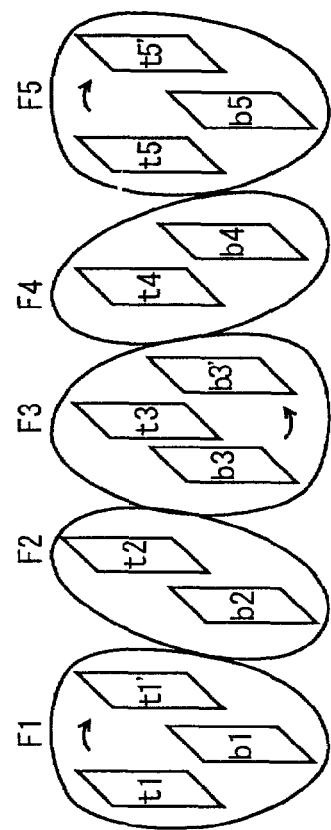
FIG. 7 is a schematic diagram illustrating a 3:2 pull-down process.

First, a supplementary explanation will be given about the input video data supplied to the MPEG encoders. In this embodiment, the input video data is 30-Hz video data generated by 3:2 pull-down conversion from source video data having a frame rate of 24 Hz. Specifically, the original source video data with a frame rate of 24 Hz consists of the frames F1, F2, and so on, each of which has two fields (top field t1, t2, . . . and bottom field b1, b2, . . . ). As shown in FIG. 7A, the 3:2 pull-down process generates a repeat field t1' by repeating the top field t1 in the first frame F1—where the top field should appear first—to form one frame from three fields, and generates a repeat field b3' by repeating the bottom field b3 in the third frame F3 where the bottom field should appear first. In this way, the 3:2 pull-down process can convert source video data with a frame rate of 24 Hz into video data with a frame rate of 30 Hz, as shown in FIG. 7A, by alternating 3-field frames and 2-field frames.

Although in this embodiment input video data is generated by 3:2 pull-down, the present invention is not limited to video data whose input video data has undergone 3:2 pull-down. It can also be applied to video data that has not undergone 3:2 pull-down, provided the original source video has a frame rate of 30 Hz.

Figure 6:
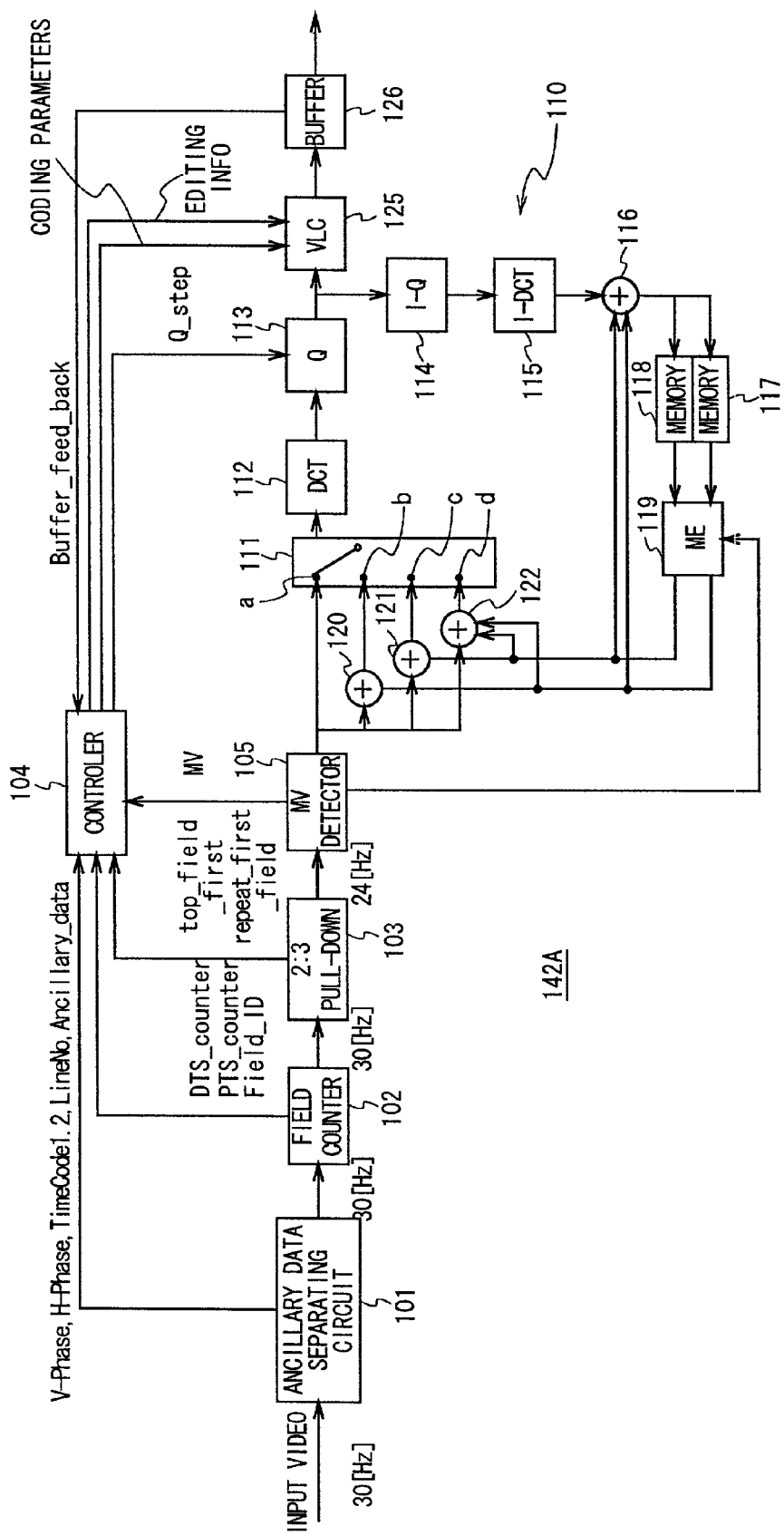
FIG. 6 is a block diagram showing the configuration of an MPEG encoder.

The MPEG encoder shown in FIG. 6 comprises an ancillary data separating circuit 101, a field counter 102, a 2:3 pull-down circuit 103, an encoding controller 104, a motion vector detector 105, a switching circuit 111, a DCT circuit 112, a quantizing circuit 113, an inverse quantizing circuit 114, an inverse DCT circuit 115, an adding circuit 116, memories 117 and 118, a motion compensating circuit 119, arithmetic circuits 120, 121, and 122, a variable-length coding circuit 125, and a send buffer 126.

Figure 8:
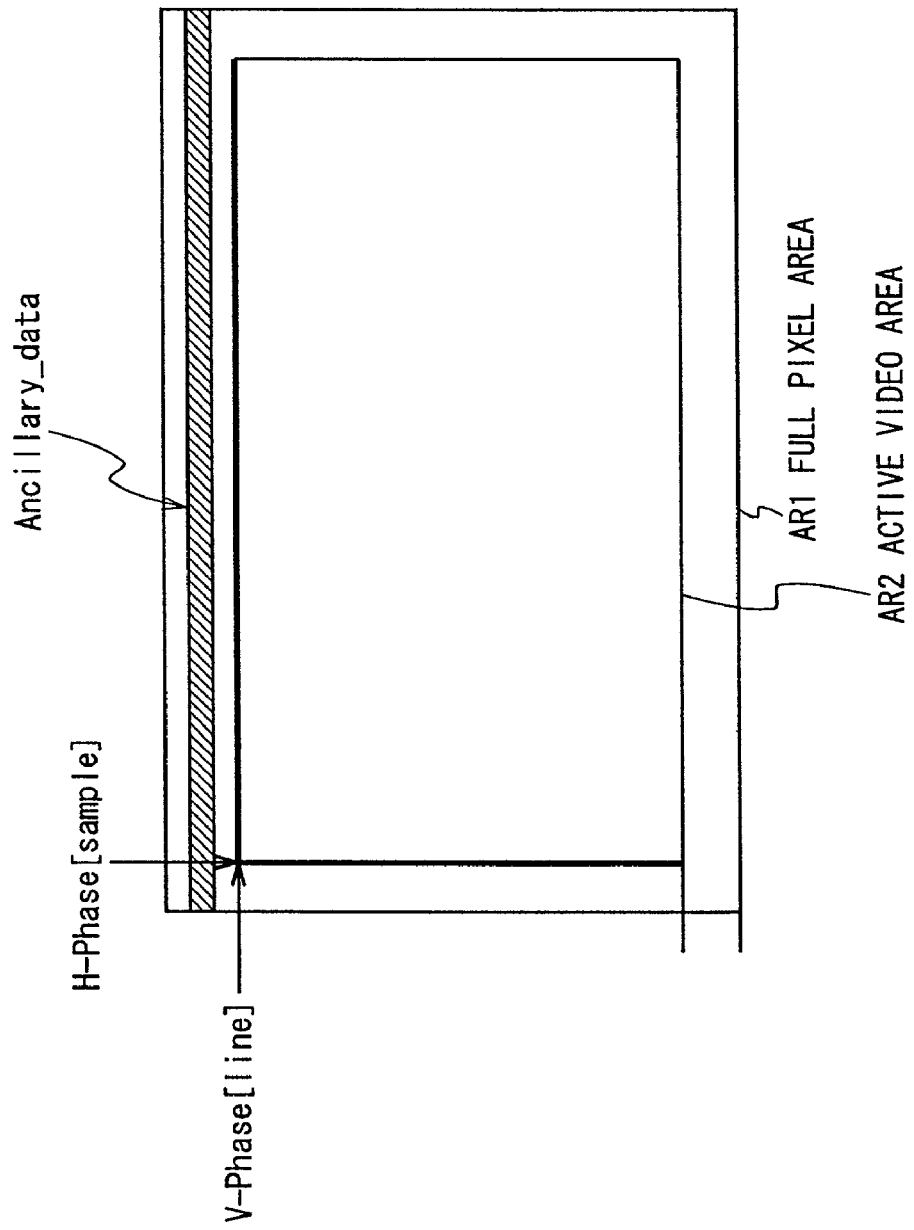
FIG. 8 is a schematic diagram showing the full pixel area and active video area of video data.

The ancillary data separating circuit 101 extracts ancillary data from the blanking interval of input video data. More particularly, as shown in FIG. 8, it extracts the ancillary data inserted in the vertical blanking interval of input video data and the line number of the ancillary data. Such ancillary data includes, but is not limited to, text data, closed-captioning data, VITC (vertical interval time code) defined by SMPTE RP164, and LTC (linear time code) defined by RP196. In this embodiment, information about the extracted ancillary data is supplied to the controller 104 as Ancillary_data while information about the line number is supplied to the controller 104 as Line_number. Also, information about VITC is suppLied to the controller 104 as Time_code_1 and information about LTC is supplied to the controller 104 as Time_code_2.

Besides, the ancillary data separating circuit 101 extracts the unique information possessed by input video data. Such unique information may be, for example, data about the location of the active video area AR2 with respect to the full pixel area AR1 of input video data as shown in FIG. 8. Specifically, it may include the number of lines that represents the vertical start position of the active video area and the number of samples that represents the horizontal start position. In this embodiment, the information about the vertical and horizontal positions of the active video area are supplied to the controller 104 as V-phase and H-phase, respectively. Other examples of the unique information includes the source name given to the input video data and the location and time of photo shooting.

The video data output from the ancillary data separating circuit 101 is supplied to the field counter 102 that follows. The field counter 102 is the circuit for counting the fields that compose each frame of the input video data. Then the field counter 102 supplies the count information of each frame to the controller 104 as Field_ID. If, for example, the video data shown in FIG. 7A is supplied to the field counter 102, Field_ID of "0," "1," and "2" are output as the count information for frame F1, which has three fields, and Field_ID of "0" and "1" are output as the count information for frame F2, which has two fields.

The field counter 102 further comprises two counters that count the fields in the input video data and outputs the count information to the controller 104 as PTS_counter and DTS_counter.

When generating an ES header, PTS_counter is used to generate presentation time stamps (PTSs) and DTS_counter is used to generate decoding time stamps (DTSs).

Now PTS_counter and DTS_counter will be described in detail with reference to FIG. 9.

FIG. 9 shows the frame structure of each frame in the input video data as well as the relationship between PTS_counter and DTS_counter in each frame. Before going into details on FIG. 9, a supplementary explanation will be given about the Repeat_first_field and Top_field_first flags. If the Repeat_first_field flag is set to "1," it indicates that a repeat field must be created during MPEG decoding and if the Repeat_first_field flag is set to "0," it indicates that a repeat field need not be created during MPEG decoding. The Top_field_first flag indicates whether the first field of the frame is the top field or bottom field: the value "1" indicates that the top field appears earlier than the bottom field in the frame while the value "0" indicates that the bottom field appears earlier than the top field in the frame.

FIG. 9A illustrates the frame structure in the input video data described in FIG. 7A. Specifically, the decoding of the first frame F1 does not involve simply generating a frame consisting of a top field and bottom field, but it involves generating a frame consisting of three fields by creating a repeat field by copying the top field. Accordingly, the corresponding Repeat_first_field flag becomes "1" and the Top_field_first flag becomes "1."

In decoding frame F2, the Repeat_first_field flag is set to "0" because there is no need to generate a repeat field, and the Top_field_first flag is set to "0" because the bottom field appears earlier than the top field.

In decoding frame F3, the bottom field must be copied to create a repeat field and the coded frame must be converted into a three-field frame. Therefore, the Repeat_first_field flag is set to "1" and the Top_field_first flag is set to "0."

In decoding frame F4, there is no need to create a repeat field, so the Repeat_first_field flag is set to "0" and the Top_field_first flag is set to 1.

Since PTS_counter is the time stamp information underlying the PTS as described above, it must agree with the frame order of input video data. Specifically, PTS_counter is the value generated by a counter that increases from 0 to 127 and then returns to 0 again. The value of the counter PTS_counter changes in the manner shown in FIG. 9B.

More particularly, since the first frame F1 in input video data is an I-picture and must be presented first, the value of PTS_counter is "0."

The value of PTS_counter for the second frame F2 is the value "0" of PTS_counter for frame F1 plus the number "3" of fields contained in frame F1, and thus is "3" (=0+3).

The value of PTS_counter for the third frame F3 is the value "3" of PTS_counter for frame F2 plus the number "2" of fields contained in frame F2, and thus is "5" (=3+2). The value of PTS_counter for the fourth frame F4 is the value "5" of PTS_counter for frame F3 plus the number "3" of fields contained in frame F3, and thus is "8" (=5+3). The value of PTS_counter for the fifth frame F5 and subsequent frames are calculated in a similar manner.

Besides, since DTS_counter is the time stamp information underlying the DTS, it must agree with the order of pictures in encoded streams rather than with the frame order of input video data.

Now this will be described in more concrete terms with reference to FIG. 9C. Since the first frame F1 is an I-picture, it must be decoded one frame earlier than it is displayed. In other words, since frame F0 preceding the frame F1 consists of two fields, the value of DTS_counter must be three fields ahead of the reference time "0," i.e., it must be "125," if the presentation time stamp PTS_counter=0 is used as the reference time. DTS_counter is given as a value modulo $2^7$ (=128), and thus it cycles between 0 and 127.

The value of DTS_counter for frame F4 encoded after frame F1 is equal to "0" (=128=125+3), which is given as the value "125" of DTS_counter for frame F1 plus the number "3" of fields in frame F1.

Since frame F2 encoded next is a B-picture, the value of DTS_counter is equal to the value of PTS_counter, which is equal to "3." Similarly, frame F3 encoded next is a B-picture, and thus the value of DTS_counter is equal to the value of PTS_counter, which is equal to "5." The values of DTS_counter for frame F7 and subsequent frames are calculated similarly and the description thereof will be omitted herein.

The field counter 102 generates PTS_counter and DTS_counter and supplies them to the controller 104 according to the rules described above.

Figure 7B:
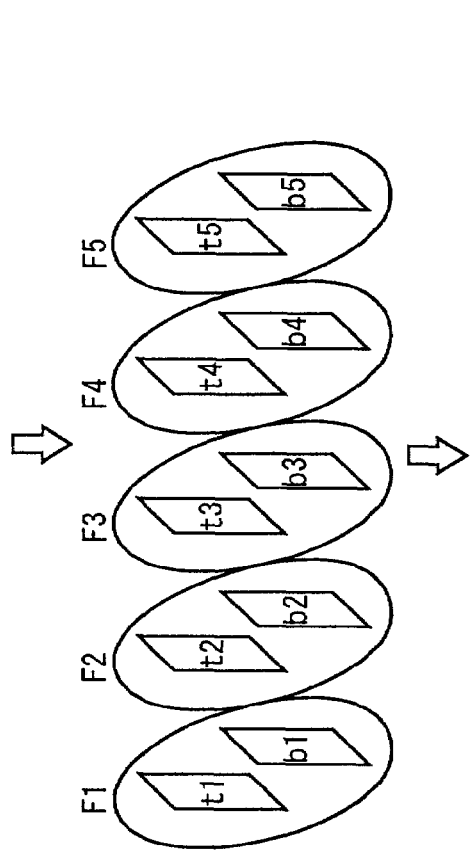

The 2:3 pull-down circuit 103 receives the video data output from the field counter 102 and performs 2:3 pull-down. The 2:3 pull-down circuit 103 receives the video data with a frame rate of 30 Hz that has undergone 3:2 pull-down as shown in FIG. 7A and generates video data with a frame rate of 24 Hz. More particularly, as shown in FIG. 7B, the 2:3 pull-down circuit 103. converts video data with a frame rate of 30 Hz into video data with a frame rate of 24 Hz by removing the repeat fields t1' and b3' inserted by 3:2 pull-down. In removing repeat fields, the 2:3 pull-down circuit 103 analyzes the frame structure of the supplied video data and removes only the repeat fields that are found to occur at certain intervals. Thus, when analyzing the frame structure of video data, the 2:3 pull-down circuit 103 generates Repeat_first_field and Top_field_first flags as information about the frame structure and supplies them to the controller 104.

The motion vector detector 105 receives, in macroblocks, the video data output from the 2:3 pull-down circuit 103 and processes the image data in each frame as an I-picture, P-picture, or B-picture according to a predetermined sequence. The question as to how to process the image of each frame—as an I-picture, P-picture, or B-picture—has been predetermined according to the GOP structure specified by the operator. Any motion vector MV detected is supplied to the controller 104 and motion compensating circuit 119.

When the intra-picture prediction mode is activated, the switching circuit 111 closes the contact a. Therefore, the macroblock data is transmitted to the transmission path through the DCT circuit 112, quantizing circuit 113, variable-length coding circuit 125, and send buffer 126, as is the case with I-picture data. The quantized data is also supplied to the frame memory 117 for backward predictive pictures through the inverse quantizing circuit 114, inverse DCT circuit 115, and arithmetic unit 116. On the other hand, when the forward prediction mode is activated, the switch 111 closes the contact b, the image data (the image data of the I-picture in this case) stored in the frame memory 118 for forward predictive pictures is read out, and compensation is made by the motion compensating circuit 119 based on the motion vector MV supplied by the motion vector detector 105. In other words, when instructed to activate the forward prediction mode, the motion compensating circuit 119 reads data to generate predicted picture data, by offsetting the read address of the frame memory 118 for forward predictive pictures from the location that corresponds to the location of the macroblock currently output by the motion vector detector 105 by the amount equivalent to the motion vector.

The predicted picture data output by the motion compensating circuit 119 is supplied to the arithmetic unit 120. Then, from the data in the macroblock of the reference image, the arithmetic unit 120 subtracts the predicted picture data supplied by the motion compensating circuit 119 and corresponding to the macroblock, and outputs the difference (prediction error). This differential data is transmitted to the transmission path through the DCT circuit 112, quantizing circuit 113, variable-length coding circuit 125, and send buffer 126. Also, this differential data is decoded locally by the quantizing circuit 114 and inverse DCT circuit 115, and is input to the arithmetic unit 116.

The arithmetic unit 116 has also been supplied with the same data as the predicted picture data supplied to the arithmetic unit 120. The arithmetic unit 116 adds the predicted picture data output by the motion compensating circuit 119, to the differential data output by the inverse DCT circuit 115. This produces the image data of the original (decoded) P-picture. The image data of the P-picture is supplied to the backward predictive picture section of the frame memory 117, where it is stored.

After the data of the I-picture and P-picture is stored in the forward predictive picture section 118 and the backward predictive picture section 117, respectively, the motion vector detector 105 processes the next picture, B-picture. In intra-picture prediction mode or forward prediction mode, the switch 111 closes the contacts a or b, respectively. The picture is processed in the same manner as P-pictures and the data is transmitted.

On the other hand, when the backward prediction mode or bidirectional prediction mode is activated, switch 111 closes the contact c or d, respectively.

In backward prediction mode with the contact c in the switch 111 closed, the image data (images of the P-picture in this case) stored in the backward predictive picture section 117 is read out and has its motion compensated by the motion compensating circuit 119 according to the motion picture output by the motion vector 105. In other words, when the backward prediction mode is activated, the motion compensating circuit 119 reads data to generate predicted picture data, by offsetting the read address of the backward predictive picture section 117 from the location that corresponds to the location of the macroblock currently output by the motion vector detector 105 by the amount equivalent to the motion vector.

The predicted picture data output by the motion compensating circuit 119 is supplied to the computing unit 121. Then the computing unit 121 subtracts the predicted picture data supplied by the motion compensating circuit 119, from the data in the macroblock of the reference image and outputs the difference. This differential data is transmitted to the transmission path through the DCT circuit 112, quantizing circuit 113, variable-length coding circuit 125, and send buffer 126.

In bidirectional prediction mode with the contact d in the switch 111 closed, the image data (images of the I-picture in this case) stored in the forward predictive picture section 118 and image data (images of the P-picture in this case) stored in the backward predictive picture section 117 are read out and have their motions compensated by the motion compensating circuit 119 according to the motion picture output by the motion vector detector 105.

In other words, when the bidirectional prediction mode is activated, the motion compensating circuit 119 reads data to generate predicted picture data, by offsetting the read addresses of the forward predictive picture section 118 and backward predictive picture section 117 from the locations that correspond to the locations of the macroblock currently output by the motion vector detector 105 by the amount equivalent to the motion vectors (for both forward predictive picture and backward predictive picture, in this case). The predicted picture data output by the motion compensating circuit 119 is supplied to the computing unit 122. Then the computing unit 122 subtracts the average of the predicted picture data supplied by the motion compensating circuit 119, from the data in the macroblock of the reference image supplied by the motion vector detector 105 and outputs the difference. This differential data is transmitted to the transmission path through the DCT circuit 112, quantizing circuit 113, variable-length coding circuit 125, and send buffer 126.

The images of B-pictures are not stored in the frame memories 117 and 118 because they are not used as predicted pictures for other pictures.

The controller 104 controls all the circuits involved in the prediction mode processing, DCT mode processing, and quantization processing described above. Besides, the controller 104 supplies all the coding parameters, including motion vectors, picture types, prediction modes, DCT modes, quantizing steps, generated during the encoding of pictures to the variable-length coding circuit 125.

Furthermore, the controller 104 receives V-phase, H-phase, Time_code1, Time_code2, Ancillary_data, and Line_number information from the ancillary data separating circuit 101 and receives DTS_counter, PTS_counter, and Field_ID information from the field counter 102. Then it supplies the received V-phase, H-phase, Time_code1, Time_code2, Ancillary_data, Line_number, DTS_counter, PTS_counter, and Field_ID information to the variable-length coding circuit 125 as MPEG_ES_editing_information (i).

The variable-length coding circuit 125 converts the quantized DCT coefficient received from the quantizing circuit 113 and coding parameters received from the controller 104 into variable-length codes to generate an encoded stream according to the syntax of elementary streams specified by the MPEG standard.

A characteristic feature of this embodiment is that the variable-length coding circuit 125 also converts the information supplied from the controller 104 as MPEG_ES_editing_ information (i) into variable-length codes and inserts them into the encoded stream. The syntax of encoded streams and the syntax of MPEG_ES_editing_information (i) will be described in detail later.

Figure 26:
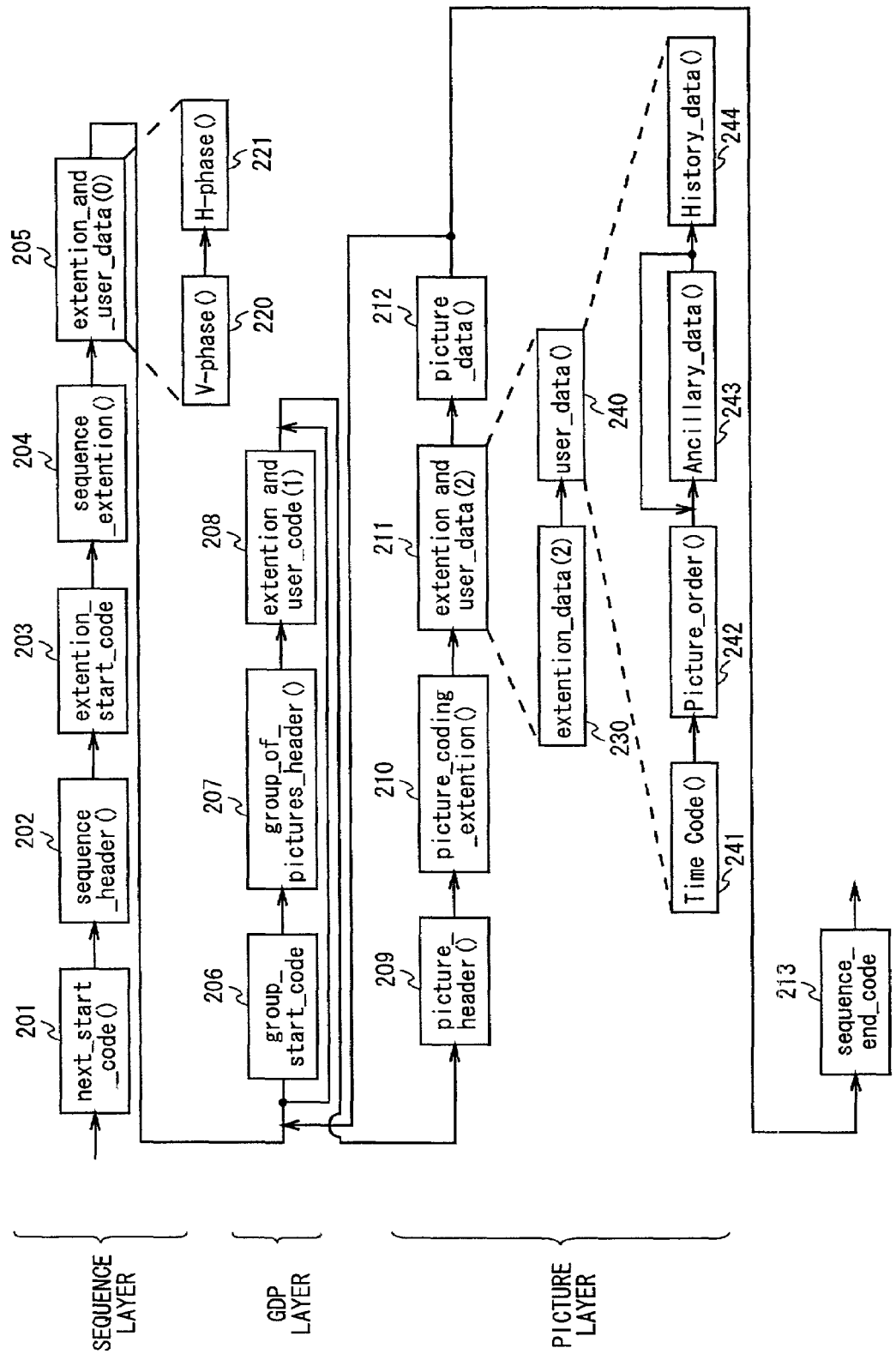
FIG. 26 is a schematic diagram showing the data of a sequence layer, GOP layer, and picture layer.

Now the syntax of bit streams will be described with reference to FIGS. 10 to 26. Incidentally, FIG. 26 is an explanatory drawing illustrating the data structure of an MPEG encoded stream in an easy-to-understand form while FIGS. 10 to 25 describe the syntax in detail.

FIG. 10 shows the syntax of a video stream of MPEG. The MPEG encoder 42 generates encoded elementary streams according to the syntax shown in FIG. 10. In the descriptions of syntaxes that follow, functions and conditional statements are shown in lightface while data elements are shown in boldface. Data items are expressed in mnemonic form that represents their name, bit length, type, and transmission order.

First the functions used in the syntax shown in FIG. 10 will be described. Actually, the syntax shown in FIG. 10 is used by the MPEG encoder 44 to extract meaningful data elements from the encoded bit stream received. The syntax used by the MPEG encoder 42 is the syntax obtained by omitting the conditional statements such as if and while statements from the syntax shown in FIG. 10.

next_start_code( ) described first in video_sequence( ) is designed to search a bit stream for a start code. In any encoded stream generated according to the syntax shown in FIG. 10, the data element defined by sequence_header( ) and sequence_extension( ) are described first. The sequence_header( ) function is used to define header data for the sequence layer of an MPEG bit stream while the sequence_extension( ) function is used to define extension data for the sequence layer of the MPEG bit stream.

The "do { } while" syntax placed next to the sequence_extension( ) function indicates that the data elements described based on the function in the braces { } of the do statement will remain in the encoded data stream while the condition defined by the while statement is true. The nextbits( ) function contained in the while statement is used to compare the bits or bit string described in the bit stream with the data elements referenced. In the example shown in FIG. 10, the nextbits( ) function compares the bit string in the bit stream with sequence_end_code that indicates the end of the video sequence, and if they do not match, the condition in the while statement holds true. Therefore, the "do { } while" syntax placed next to the sequence_extension( ) function indicates that the data elements defined by the function in the do statement will remain in the encoded bit stream until sequence_end_code that indicates the end of the video sequence is encountered.

In the encoded bit stream, following the data elements defined by the sequence_extension( ) function, the data elements defined by extension_and_user_data(0) have been described. The extension_and_user_data(0) function is used to define extension data and user data for the sequence layer of an MPEG bit stream. The "do { } while" syntax placed next to extension_and_user_data(0) indicates that the data elements described based on the function in the braces { } of the do statement will remain in the bit stream while the condition defined by the while statement is true. The nextbits( ) function contained in the while statement is used to determine the match between the bits or bit string in the bit stream and picture_start_code or group_start_code. If the bits or bit string in the bit stream and picture_start_code or group_start_ code match, the condition defined by the while statement holds true. Therefore, the "do { } while" syntax indicates that if picture_start_code or group_start_code appears in the encoded bit stream, the data element codes defined by the function in the do statement are described next to the start code. The if statement described at the beginning of the do statement specifies the condition that group_start_code appears in the encoded bit stream. If the condition presented by the if statement is true, the data elements defined by group_of_picture_header( ) and extension_and_user_data(1) are described in sequence next to group_start_code in the encoded bit stream. The group_of_picture_header( ) function is used to define header data for the GOP layer of an MPEG encoded bit stream while the extension_and_user_data(1) function is used to define extension data and user data for the GOP layer of the MPEG encoded bit stream.

Besides, in this encoded bit stream, next to the data elements defined by group_of_picture_header( ) and extension_and_user_data(1), data elements defined by picture_header( ) and picture_coding_extension( ) have been described. Of course, if the condition of the if statement described above does not hold true, the data elements defined by group_of_picture_header( ) and extension_and_user_data (1) are not described, and thus next to the data elements defined by extension_and_user_data(0), the data elements defined by picture_header( ), picture_coding_extension( ) and extension_and_user_data(2) are described.

The picture_header( ) function is used to define header data for the picture layer of an MPEG encoded bit stream while the picture_coding_extension( ) function is used to define first extension data for the picture layer of the MPEG encoded bit stream. The extension_and_user_data(2) function is used to define extension data and user data for the picture layer of the MPEG encoded bit stream. The user data defined by extension_and_user_data(2) has been defined in the picture layer and can be defined for each picture.

In the encoded bit stream, next to the user data in the picture layer, the data elements defined by picture_data( ) have been described. The picture_data( ) function is used to describe data elements associated with a slice layer and macroblock layer.

The while statement described next to the picture_data( ) function is the function used to judge the condition of the next if statement while the condition defined by the while statement is true. The nextbits( ) function contained in the while statement is used to determine whether picture_start_code or group_start_code has been described in the encoded bit stream. If picture_start_code or group_start_code has been described in the encoded bit stream, the condition defined by the while statement holds true.

The if statement that appears next is the conditional statement used to determine whether sequence_end_code has been described in the encoded bit stream. It indicates that if sequence_end_code has not been described, the data elements defined by sequence_header( ) and sequence_extension( ) have been described. Since sequence_end_code is the code that indicates the end of the sequence of an encoded video stream, the data elements defined by sequence_header( ) and sequence_extension( ) should remain in the encoded video stream unless the encoded video stream has ended.

The data elements described here by sequence_header( ) and sequence_extension( ) are exactly the same as the data elements described by sequence_header( ) and sequence_extension( ) at the beginning of the sequence of the video stream. In this way, the same data is described in a stream more than once to avoid cases in which it will become impossible to receive sequence layer data and decode the stream when the data stream is received from the middle (e.g., the part of the bit stream that corresponds to the picture layer) by the bit stream receiver.

After the data elements defined by the last sequence_header( ) and sequence_extension( ), i.e., at the end of the data stream, two-bit sequence_end_code is described indicating the end of the sequence.

Now detailed description will be given of sequence-header( ), sequence_extension( ), extension_and_user_data (0), group_of_picture_header( ), picture_header( ), picture_coding_extension( ), and picture_data.

FIG. 11 illustrates the syntax of sequence_header( ). The data elements defined by sequence_header( ) include sequence_header_code, horizontal_size_value, vertical_size_value, aspect_ratio information, frame_rate_code, bit_rate_value, marker_bit, vbv_buffer_size_value, constrained_parameter_flag, load_intra_quantizer_matrix, intra_quantizer_matrix[64], load_non_intra_quantizer_matrix, non_intra_quantizer_matrix, etc.

sequence_header_code is the data that represents the start synchronization code of the sequence layer. horizontal_size_value is the data that consists of the low-order 12 bits of the horizontal pixel count of an image. vertical_size_value is the data that consists of the low-order 12 bits of the vertical line count of an image. aspect_ratio_information is the data that represents the aspect ratio of a pixel or a display screen. frame_rate_code is the data that represents the display cycle of an image. bit_rate_value is the data that consists of the low-order 18 bits (rounded up to the nearest multiple of 400 bps) of the bit rate used to limit the amount of bits generated. marker_bit is the bit data that is inserted to avoid start code emulation. vbv_buffer_size_value represents the low-order 10 bits of the value that determines the size of the virtual buffer (video buffer verifier) for controlling the amount of codes generated. constrained_parameter_flag is the data which indicates that parameters fall within limits. load_intra_quantizer_matrix is the data that indicates the existence of quantization matrix data for intra MB. intra_quantizer_matrix[64] is the data that represents the value of the quantization matrix for intra MB. load_non_intra_quantizer_matrix is the data that indicates the existence of quantization matrix data for non-intra MB. non_intra_quantizer_matrix is the data that represents the value of the quantization matrix for non-intra MB.

FIG. 12 illustrates the syntax of sequence_extension( ). The data elements defined by sequence_extension( ) include extension_start_code, extension_start_code_identifier, profile_and_level_indication, progressive_sequence, chroma_format, horizontal_size_extension, vertical_size_extension, bit_rate_extension, vbv_buffer_size_extension, low_delay, frame_rate_extension_n, frame_rate_extension_d, etc.

extension_start_code is the data that represents the start synchronization code of extension data. extension_start_code_identifier is the data that indicates which extension data will be sent. profile_and_level_indication is the data used to specify the profile and level of video data. progressive_sequence is the data which indicates that video data is to be scanned sequentially. chroma_format is the data used to specify the color difference format of video data. horizontal_size_extension represents the high-order 2 bits of the data to be added to horizontal_size_value in the sequence header. vertical_size_extension represents the high-order 2 bits of the data to be added to vertical_size_value in the sequence header. bit_rate_extension represents the high-order 12 bits of the data to be added to bit_rate_value in the sequence header. vbv_buffer_size_extension represents the high-order 8 bits of the data to be added to vbv_buffer_size_value in the sequence header. low_delay is the data which indicates that no B-picture is included. frame_rate_extension_n is used in conjunction with frame_rate_code in the sequence header to obtain the frame rate. frame_rate_extension_d is used in conjunction with frame_rate_code in the sequence header to obtain the frame rate.

FIG. 13 illustrates the syntax of extension_and_user_data (i) When "i" is other than 1, extension_and_user_data(i) describes only the data elements defined by user_data( ), and not the data elements defined by extension_data( ). Therefore, extension_and_user_data(0) describes only the data elements defined by user_data( ).

First, the functions used by the syntax shown in FIG. 13 will be described. The nextbits( ) function is used to compare the bits or bit string in the bit stream with the data element to be decoded next.

user_data( ) in FIG. 14 illustrates the characteristic features of this embodiment. As shown in FIG. 14, the user_data( ) function is used to describe the data elements associated with user_data_start_code, V-phase( ), H-phase( ), Time_code( ), Picture_order( ), Ancillary_data( ), history_data( ), and user_data( ).

user_data_start_code is the start code used to indicate the start of the user data area in the picture layer of an MPEG bit stream. The if statement described next to this code specifies to run the while syntax that follows if i in user_data(i) is "0." The while syntax remains true unless 24-bit data consisting of twenty-three "0's" and accompanying "1" appears in the bit stream.

The 24-bit data consisting of twenty-three "0's" and accompanying "1" is added to the beginning of all start codes, allowing the nextbits( ) function to find the location of each of the start codes in the bit stream.

If the while statement is true, it follows that i in user_data(i) is "0," and thus there should be extension_and_user_data(0) in the sequence layer. This means that in the sequence layer in FIG. 26, data elements associated with extension_and_user_data(0) 205 have been described. If a bit string (Data_ID) representing H-Phase is detected, the nextbits( ) function in the next if statement knows that the subsequent bits describe the V-Phase data elements indicated by V-Phase( ). If a bit string (Data_ID) representing H-Phase is detected, the nextbits( ) function in the next Else if statement knows that the subsequent bits describe the H-Phase data elements indicated by H-Phase( ).

This means that the data elements associated with V-Phase( ) 220 and H-Phase( ) 221 have been described in the user data area of the sequence layer as shown in FIG. 26.

As shown in FIG. 15, Data_ID of V-Phase is a bit string representing "01." Data_ID of H-Phase is a bit string representing "02."

Now the syntax of V-Phase( ) described in the bit stream will be explained with reference to FIG. 16. As described above, Data_ID is the 8-bit data which indicates that the data elements of the next bit string is V-Phase, i.e., the value "01" shown in FIG. 15. V-Phase is the 16-bit data that indicates the first line to be encoded in a video signal frame. In other words, V-Phase is the data that indicates the vertical line number of the active video area.

Now the syntax of H-Phase( ) described in the bit stream will be explained with reference to FIG. 17. As described above, Data_ID is the 8-bit data which indicates that the data elements of the next bit string is H-Phase, i.e., the value "02" shown in FIG. 15. H-Phase is the 8-bit data that indicates the first sample to be encoded in a video signal frame. In other words, H-Phase is the data that indicates the horizontal pixel sample position of the active video area.

Returning to FIG. 14, the next Else if statement executes the next while syntax if i in extension_and_user_data(i) is 2. Description of the while syntax will be omitted because it has the same meaning as the while syntaxes described above.

When the while syntax is true, if a bit string indicating Time code1 or Time code2 is detected, the nextbits( ) function in the next if statement knows that the subsequent bits describe the time code data elements indicated by Time_code( ). This means that if i in extension_and_user_data(i) is 2, this user data is contained in the picture layer. That is, the data elements represented by Time_code( ) 241 have been described in the user data area of the picture layer as shown in FIG. 26.

Data_ID of Time code1 is a bit string representing "3" as shown in FIG. 15. Time code1 data is the VITC (vertical interval time code) that represents the time code inserted in the vertical blanking interval of an image. Data_ID of Time code2 is a bit string representing "04" as shown in FIG. 15. Time code2 data is the LTC (longitudinal time code or linear time code) that represents the time code recorded on the time code track of the recording medium.

FIGS. 18 and 19 show the syntax of Time_code ( ). As shown in FIG. 18, the time code consists of 72-bit data. FIG. 19 shows the concrete data structure.

In FIG. 19, color_frame_flag represents the control flag of color frame information while Drop_frame_flag that follows represents the control flag of dropped frames. The six bits from the third bit to the eighth bit represent the 'frame' section of the time code: field_phase represents the control flag of phase correction. The seven bits from the 10th bit to the 16th bit represent the 'seconds' section of the time code. The '1' in the 17th, 34th, 51st, and 68th bits is a marker bit used to prevent 0 from occurring 23 times successively. The insertion of the marker bit at certain intervals can prevent start code emulation.

binary_group in the 18th, 26th, and 27th bits represents a control flag for binary groups. The seven bits from the 19th bit to the 25th bit represent the 'minutes' section of the time code while the six bits from the 28th bit to the 33rd bit represent the 'hours' section of the time code.

In FIG. 14, if a bit string indicating a picture order is detected, the nextbits( ) function in the Else if statement knows that the subsequent bits describe the picture order data elements indicated by Picture_Order( ). Data_ID of Picture_Order( ) is a bit string representing "05" as shown in FIG. 15.

Now the syntax of Picture_Order( ) inserted actually into the elementary stream (ES) by the encoder will be described with reference to FIG. 20. As described above, Data_ID is the 8-bit data which indicates that the subsequent data is the Picture_Order data and its value is "05." DTS_presence is the 1-bit data that indicates the presence or absence of the coding order DTS_counter. For example, if DTS_counter=PTS_counter as in the case of B-pictures, only the presentation order PTS_counter exists and the bit of DTS_presence becomes "0." Conversely, in case of P-pictures and I-pictures, the coding order DTS_counter and presentation order PTS_counter are not equal, so both coding order DTS_counter and presentation order PTS counter exist and the bit of DTS_presence becomes 1. As described in FIG. 26, the data elements associated with Picture_Order( ) are described in the user data area of the picture layer as is the case with Time_Code( ).

As described above, PTS_counter is the value generated by the field counter 102 in the MPEG encoder. It is the 7-bit data which represents the presentation order and which is incremented by 1 each time one field of the input video data is filled. This 7-bit data is given as the remainder of modulo division and takes on values from 0 to 127. The if statement indicates that DTS_counter is incremented if the bit of DTS_presence is 1, i.e., in the case of a P-picture and I-picture.

Marker_bits is inserted every 16 bits to prevent start code emulation, a phenomenon in which a described bit string of user data accidentally matches the start code described above leading to a high possibility of image corruption.

DTS_counter is the value generated by the field counter 102 in the MPEG encoder. It is the 7-bit data which represents the coding order and which is incremented by 1 each time one field of the input video data is encoded. This 7-bit data is given as the remainder of modulo division and takes on values from 0 to 127.

Returning to FIG. 14, the while syntax has the same meaning as the while syntaxes described above, and thus description thereof will be omitted. When the while syntax is true, if a bit string indicating ancillary data is detected, the nextbits( ) function in the next if statement knows that the subsequent bits describe the ancillary data elements indicated by Ancillary_data( ). Data_ID of Ancillary_data( ) is a bit string representing "07" as shown in FIG. 15. As shown in FIG. 26, the data elements associated with Ancillary_data( ) have been described in the user data area of the picture layer as is the case with Picture_Order( ) and Time_Code( ).

Now the syntax of Ancillary_data( ) that adds identifiers to ancillary data will be described with reference to FIG. 21. Ancillary_data( ), which is inserted as user data in the picture layer, includes a field identifier (Field_ID), a line number (Line_number), and ancillary data.

Data_ID is 8-bit data which is an ancillary data in the user data area, having a value of "07" as shown in FIG. 15.

Field_ID is the 2-bit data that is added to each field in coded frames when the value of progressive_sequence_flag, which indicates whether the input video data is progressive video, is "0," i.e., when the input video data is interlaced video data.

Now Field_ID will be described with reference to FIG. 7.

If repeat_first_field contains "0," the given frame has two fields: Field_ID of the first field is set to "0" and Field_ID of the second field is set to "1." If repeat_first_field contains "1," the given frame has three fields: Field_ID of the first, second, and third fields is set to "0," "1," and "2," respectively.

Figure 7C:
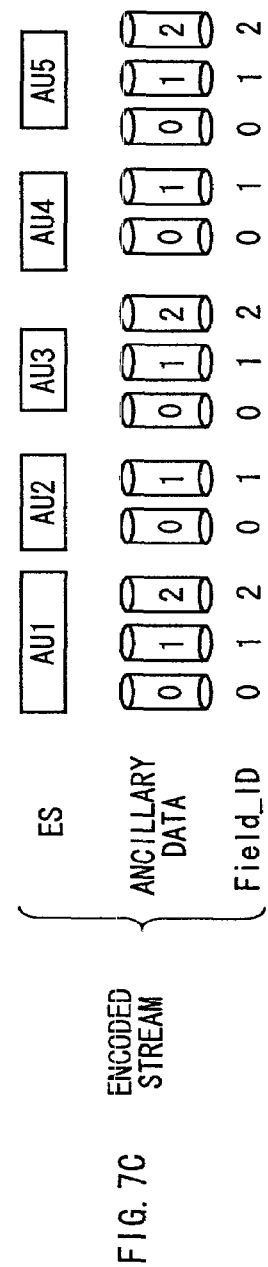

Now more detailed description will be provided with reference to FIG. 7C. The encoded stream shown in FIG. 7C is obtained when the input video data shown in FIG. 7B is encoded. This encoded stream is an elementary stream consisting of a plurality of access units (AU1, AU2, . . . ). FIG. 7C shows the ancillary data and Field_ID information described in the elementary stream.

Frame F1 of this encoded stream contains 0, 1, and 2 as Field_ID. In other words, when Field_ID=0, ancillary data "0" about that field is described in the stream, when Field_ID=1, ancillary data "1" about that field is described in the stream, and when Field_ID=2, ancillary data "2" about that field is described in the stream. This means that in the picture of frame F1, the data elements associated with Ancillary_data( ) 243 are repeated as many times as the number of the fields in frame F1, as shown in FIG. 26.

Field_ID is added for each coded frame when the value of progressive_sequence_flag, is "1," i.e., when the input video data is 1. If both repeat_first_field and Top_field_first contain Field_ID of "0," the given coded frame has one progressive frame and thus "0" is set. If repeat_first_field contains "1" and Top_field_first contains "0", the given coded frame has two progressive frames and thus "0" and "1" are set. If both repeat_first_field and Top_field_first contain "1," the given coded frame has three progressive frames and thus "0" to "2" is set.

Line_number is 14-bit data which represents the line number of the line where the ancillary data of each frame is described. This line number has been specified by ITU-R, BT.656-3, SMPTE274M, SMPTE293M, and SMPTE296M.

Ancillary_data_length is the 16-bit data which represents the data length of ancillary_data_payload. Ancillary_data_payload represents the content of 22-bit ancillary data. If the value of Ancillary_data_length for Ancillary_data_payload is larger than the value j (default of 0), the value j (data length of Ancillary_data_length) is incremented by 1 and description starts from the bit string of the value j.

The While syntax that follows shows the syntax of bytealigned( ). It describes Zero_bit (1-bit data "0") when the next data is not bytealigned( ) (when the While syntax is true).

Returning to FIG. 14, if a bit string indicating history data is detected, the nextbits( ) function in the next Else if statement knows that the subsequent bits describe the data elements of history data indicated by History_data( ). Data_ID of History_data( ) is a bit string representing "08" as shown in FIG. 15. The data represented by Data_ID of "08" represents history data that includes the history information of coding parameters. History_data( ) is described in detail in U.S. patent application Ser. No. 09/265,723, and thus description thereof is omitted herein.

If a bit string indicating user data is detected, the nextbits ( ) function in the final if statement knows that the subsequent bits describe the user_data data elements indicated by user_data( ).

The bit strings from which the nextbits( ) functions in FIG. 14 know that the subsequent bits describe appropriate data elements are described as Data_ID shown in FIG. 15. However, the use of "00" as Data_ID is prohibited. The data represented by Data_ID of "80" represents a control flag while the data represented by Data_ID of "FF" represents user data.

FIG. 22 illustrates the syntax of group_of_picture_header ( ). The data element defined by group_of_picture_header( ) consists of group_start_code, time_code, closed_gop, and broken_link.

group_start_code is the data that represents the start synchronization code of the GOP layer. time_code represents the time from the beginning of the sequence of the first picture in the GOP. closed_gop is the flag which indicates that the images in the GOP can be played back independent of other GOPS. broken_link is the flag which indicates that the B-picture at the beginning of GOP cannot be played back correctly due to editing. The extension_and_user_data(1) function is used to describe only the data elements defined by user_data ( ), as is the case with extension_and_user_data(0).

Now, with reference to FIGS. 23 to 25, description will be given of picture_header( ), picture_coding_extension( ), and picture_data( ) used to describe data elements associated with the picture layer of encoded streams.

FIG. 23 illustrates the syntax of picture_header( ). The data elements defined by picture_header( ) include picture_start_code, temporal_reference, picture_coding_type, vbv_delay, full_pel_forward_vector, forward_f_code, full_pel_backward_vector, backward_f_code, extra_bit_picture, and extra_information_picture.

Specifically, picture_start_code is the data that represents the start synchronization code of the picture layer. temporal_reference is the number that indicates the presentation order of pictures and is reset at the beginning of a GOP. picture_coding_type is the data that represents a picture type.

vbv_delay is the data that represents the initial state of a VBV buffer and is set for each picture. The pictures in the encoded elementary stream transmitted from the sending system to the receiving system is placed in the VBV buffer provided in the receiving system, fetched (read out) from this VBV buffer at the time specified by the DTS (decoding time stamp), and supplied to the decoder. The time defined by vbv_delay is the period from the moment the picture to be decoded is started to be placed in the VBV buffer until the picture to be encoded is read out from the VBV buffer, i.e., until the time defined by the DTS. The use of vbv_delay stored in the picture header allows seamless splicing avoiding discontinuity in the occupancy of the VBV buffer.

full_pel_forward_vector is the data that indicates whether the accuracy of forward motion vectors should be expressed in integers or half-pixels. forward_f_code is the data that indicates the search range of forward motion vectors. full_pel backward_vector is the data that indicates whether the accuracy of backward motion vectors should be expressed in integers or half-pixels. backward_f_code is the data that indicates the search range of backward motion vectors. extra_bit_picture is the flag that indicates the existence of subsequent additional information. If extra_bit_picture is "1," extra_information_picture follows. If extra_bit_picture is "0", no subsequent data exists. extra_information_picture is the information reserved by the standard.

FIG. 24 illustrates the syntax of picture_coding_extension( ) The data elements defined by picture_coding_extension( ) include extension_start_code, extension_start_code_identifier, f_code[0][0], f_code[0][1], f_code[1][0], f_code[1][1], intra_dc_precision, picture_structure, top_field_first, frame_predictive_frame_dct, concealment_motion_vectors, q_scale_type, intra_vlc_format, alternate_scan, repeat_first_field, chroma_420_type, progressive_frame, composite_display_flag, v_axis, field_sequence, sub_carrier, burst_amplitude, and sub_carrier_phase extension_start_code indicates the start of extension data in the picture layer. extension_start_code_identifier is the code that indicates what extension data is sent. f_code[0] [0] is the data that indicates the search range of forward horizontal motion vectors. f_code[0][1] is the data that indicates the search range of forward vertical motion vectors. f_code[1] [0] is the data that indicates the search range of backward horizontal motion vectors. f_code[1] [1] is the data that indicates the search range of backward vertical motion vectors. intra_dc_precision is the data that represents the accuracy of the DC coefficient. picture_structure is the data that indicates whether the picture has a frame structure or field structure. In the case of the field structure, it also indicates whether the field is an upper field or lower field. top_field_first is the flag that indicates whether the first field is the top field or bottom field in the case of the frame structure. frame_predictive_frame_dct is the data which indicates that the frame mode DCT prediction is only in the frame mode in the case of the frame structure. concealment_motion_vectors is the data which indicates that intra-macroblocks are provided with motion vectors for hiding transmission errors. q_scale_type is the data that indicates which quantization scale to use, linear or non-linear. intra_vlc_format is the data that indicates whether to use another two-dimensional VLC (variable-length code) for intra-macroblocks. alternate_scan is the data that indicates which scan to use, zigzag scan or alternate scan. repeat_first_field is the flag that indicates whether to generate a repeat field during decoding. If this flag is set to "1," a repeat field is generated during decoding. If this flag is set to "0," no repeat field is generated during decoding.

chroma_420_type is the data that indicates the same value as progressive_frame if the signal format is 4:2:0, and indicates 0 otherwise. progressive_frame is the data that indicates whether the picture can be scanned progressively. composite_display_flag is the data that indicates whether the source signal was a composite signal. v_axis is data used when the source signal is a PAL signal. field_sequence is data used when the source signal is a PAL signal. sub_carrier is data used when the source signal is a PAL signal. burst_amplitude is data used when the source signal is a PAL signal. sub_carrier_phase is data used when the source signal is a PAL signal.

FIG. 25 illustrates the syntax of picture_data( ). The data elements defined by picture_data( ) is the data elements defined by slice( ). However, if slice_start_code that indicates the start code of slice( ) does not exist in the bit stream, the data elements defined by slice( ) have not been described in the bit stream.

The slice( ) function is used to describe the data elements associated with a slice layer. Specifically, it is used to describe data elements such as slice_start_code, slice_quantiser_scale_code, intra_slice_flag, intra_slice, reserved_bits, extra_bit_slice, and extra_information_slice as well as the data elements defined by macroblock( ).

slice_start_code indicates the start of the data elements defined by slice( ). slice_quantiser_scale_code is the data that indicates the size of the quantizing step specified for the macroblocks in the slice layer. If quantiser_scale_code has been specified for each macroblock, however, the macroblock_quantiser_scale_code takes precedence. intra_slice_flag indicates the presence or absence of intra_slice and reserved_bits in the bit stream. intra_slice is the data that indicates the presence or absence of a non-intra macroblock in the slice layer. If any of the macroblocks in the slice layer is a non-intra macroblock, intra_slice is set to "0." If all the macroblocks in the slice layer are non-intra macroblocks, intra_slice is set to "1." reserved_bits is 7-bit data which takes on the value of "0." extra_bit_slice is the flag that indicates the presence of additional information as an encoded stream. It is set to "1" if extra_information_slice follows. It is set to "0" if no additional information exists.

The macroblock ( ) function is used to describe the data elements associated with a macroblock layer. Specifically, it is used to describe data elements such as macroblock_escape, macroblock_address_increment, and macroblock_quantiser_scale_code as well as the data elements defined by macroblock_modes( ) and macroblock_vectors(s).

macroblock_escape is the fixed bit string that indicates whether the horizontal difference between the reference macroblock and previous macroblock is equal to or more than 34. If the horizontal difference is 34 or larger, 33 is added to the value of macroblock_address_increment. macroblock_address_increment is the data that represents the horizontal difference between the reference macroblock and previous macroblock. If macroblock_address_increment is preceded by one macroblock_escape string, the actual horizontal difference between the reference macroblock and previous macroblock is the value of macroblock_address_increment plus 33. macroblock_quantiser_scale_code represents the size of the quantization step specified for each macroblock. Although slice_quantiser_scale_code has been specified for each slice layer to indicate the quantization step size of the slice layer, the quantization step size of the reference macroblock is selected if macroblock_quantiser_scale_code has been specified for the reference macroblock.

Figure 27:
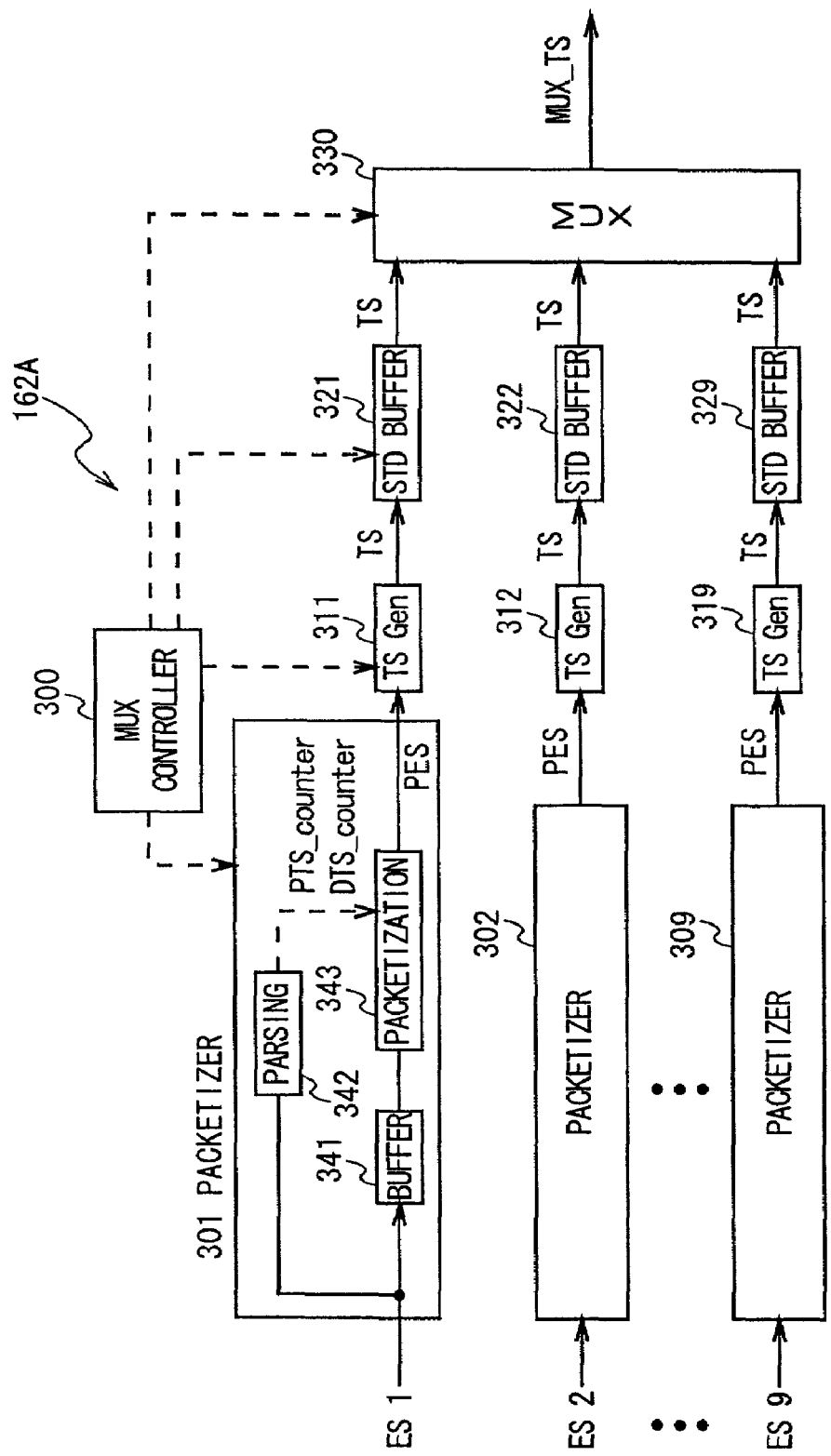
FIG. 27 is a block diagram showing the configuration of the multiplexing unit on the encoder side.

Now the multiplexer 162A will be described with reference to FIG. 27.

The multiplexer 162A comprises a plurality of packetizers 301 to 309, a plurality of transport stream generators (TS Gen.) 311 to 319, a plurality of system target decoder buffers (STD buffers) 321 to 329, a multiplexing circuit 330, and a multiplexing controller 300.

The packetizers 301 to 309 receive the respective elementary streams output by MPEG encoders and packetize the elementary streams to generate packetized elementary streams (PES).

Figure 28:
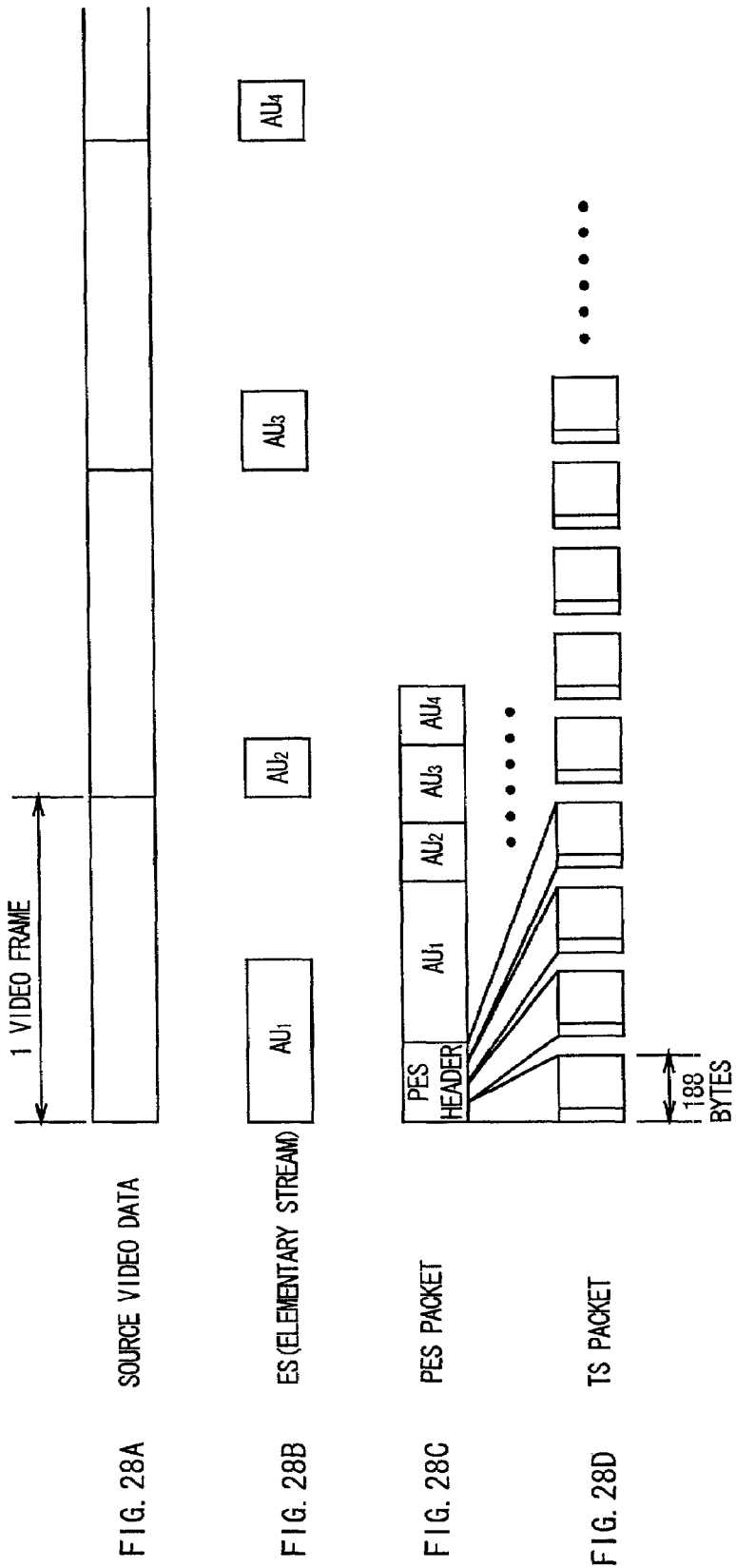
FIG. 28 is a schematic diagram illustrating the method of generating PES and TS packets from source video data.

FIG. 28 illustrates the relationship among an elementary stream (ES), a packetized elementary stream (PES), and transport stream packets.

When source video data is encoded, an elementary stream, such as the one shown in FIG. 28B, consisting of access units AU1, AU2, . . . is generated. FIG. 28C illustrates packetization performed by a packetizer. The packetizer packetizes a plurality of access units and adds a PES header to the beginning of the packet.

Figure 29:
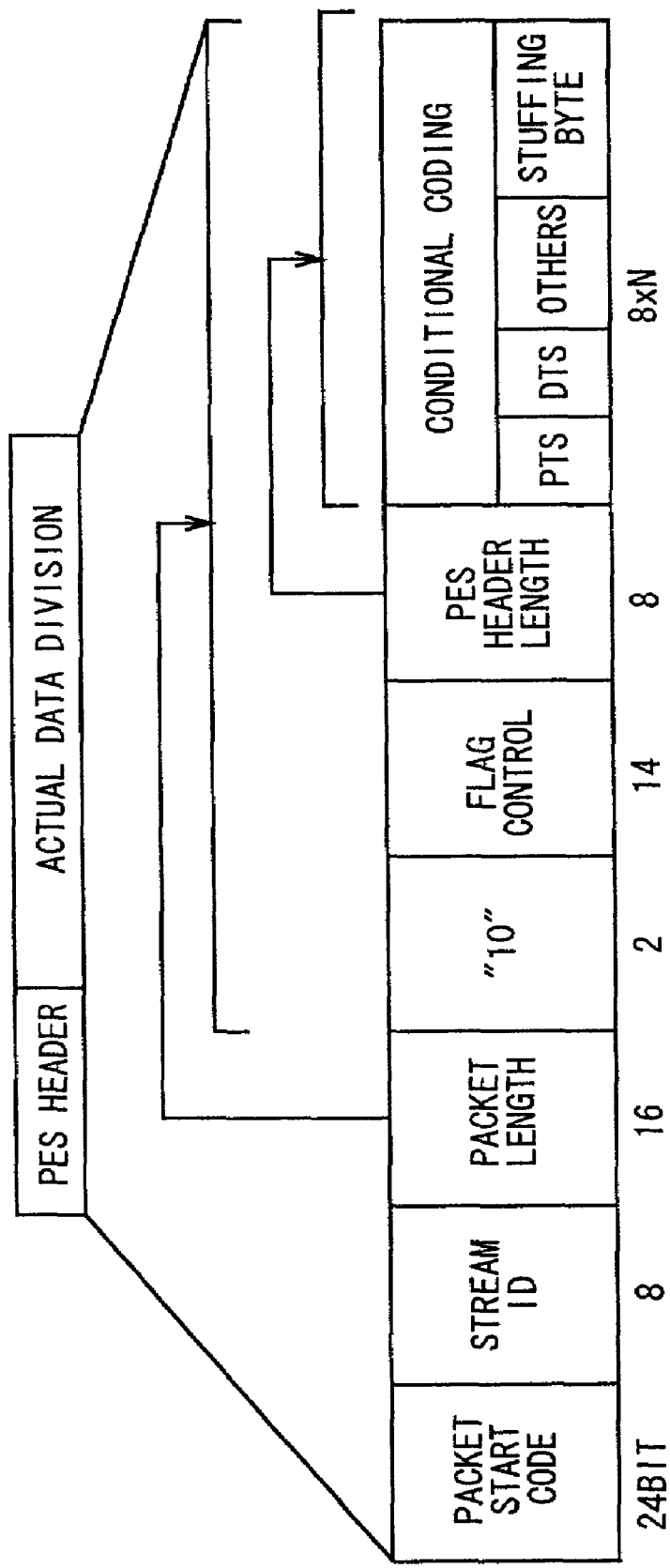
FIG. 29 is a schematic diagram showing the data structure of a PES header.

FIG. 29 illustrates the PES header. As shown in the figure, the PES header consists of Packet Start Code, Stream ID, Packet Length, symbol "10," Flag Control Code, PES Header Length, and Conditional Coding. The MPEG standard stipulates that the conditional coding must contain presentation time stamp (PTS) and decoding time stamp (DTS) information.

Each of the transport stream generators (TS Gen.) 311 to 319 generate a transport stream consisting of 188-byte transport stream packets from the packetized elementary streams output by the packetizers 301 to 309, as shown in FIG. 28D.

The system target decoder buffers (STD buffers) 321 to 329 receive the transport streams output by the transport stream generators 311 to 319 and buffer them. The STD buffers are fixed-capacity buffers specified by the MPEG standard and are provided for the purpose of simulation to prevent receive buffer from overflowing and underflowing on the MPEG decoder side.

The multiplexing circuit 330 receives a transport stream from each of the system target decoder buffers 321 to 329 and multiplexes the transport streams according to the schedule set by the controller 300.

Next, the configuration and processes of the packetizers will be described in detail with reference to FIGS. 27 and 30.

Each of the packetizer comprises a buffer 341 for buffering the elementary streams received, a parsing circuit 342 for parsing the syntax of the elementary streams received, and packetizing circuit 343 for packetizing the elementary streams output from the buffer.

The parsing circuit 342 extracts PTS_counter and DTS_counter described in the elementary stream and supplies them to the packetizing circuit 343. More particularly, the parsing circuit 342 converts the received elementary stream into variable-length codes and searches the elementary stream for start codes and other special data elements. Since the purpose of this parsing process is to extract PTS_counter and DTS_counter, the parsing process searches for the start code of the picture layer, ignoring the start code of the sequence and GOP layers. Next, the parsing process can find out the user data area of the picture layer by finding out 32-bituser_data_start_code from the stream. Then it searches for Data_ID of "05" to find out data elements associated with Picture_order( ) in this user data area. The parsing circuit 342 extracts PTS_counter and DTS_counter described in the 10th to 16th bits and 17th to 23rd bits of this Picture_order( ) function, respectively, and supplies them to the packetizing circuit 343.

The packetizing circuit 343 receives PTS_counter and DTS_counter from the parsing circuit 342 and based on this PTS_counter and DTS_counter information, generates PTS and DTS anew. This embodiment uses the value of PTS_counter itself as the PTS value and uses the value of DTS_counter as the DTS value.

Figure 30:
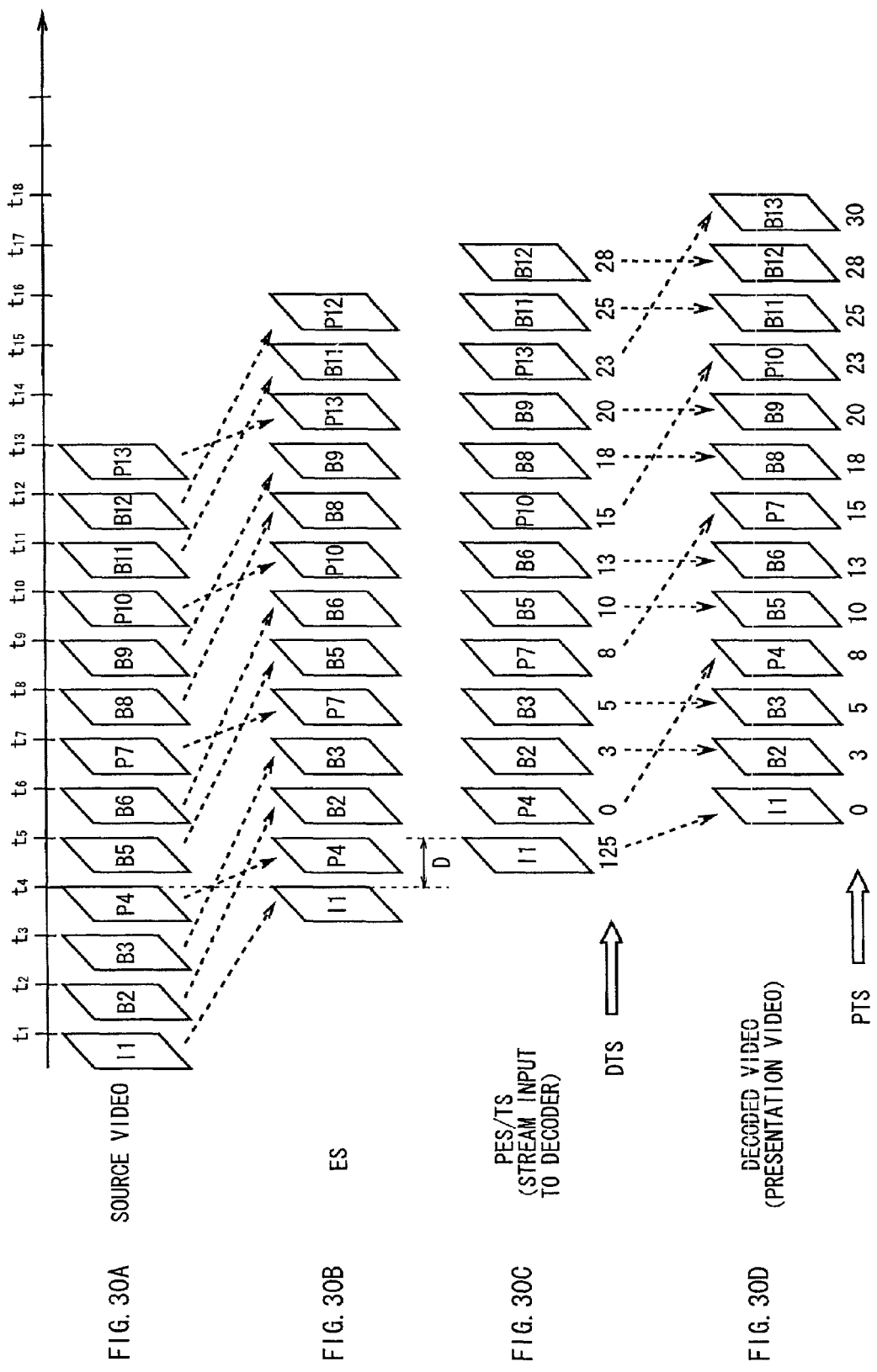
FIG. 30 is a schematic diagram showing picture sequences.

FIG. 30 illustrates the minimum delay produced when the packetizer of this embodiment is used. FIG. 30A shows input video data, FIG. 30B shows the elementary stream obtained when the input video data is encoded, and FIG. 30C shows the packetized elementary stream obtained by using the encoded stream generated by the MPEG encoder of this embodiment and packetizer of this embodiment.

Figure 1:
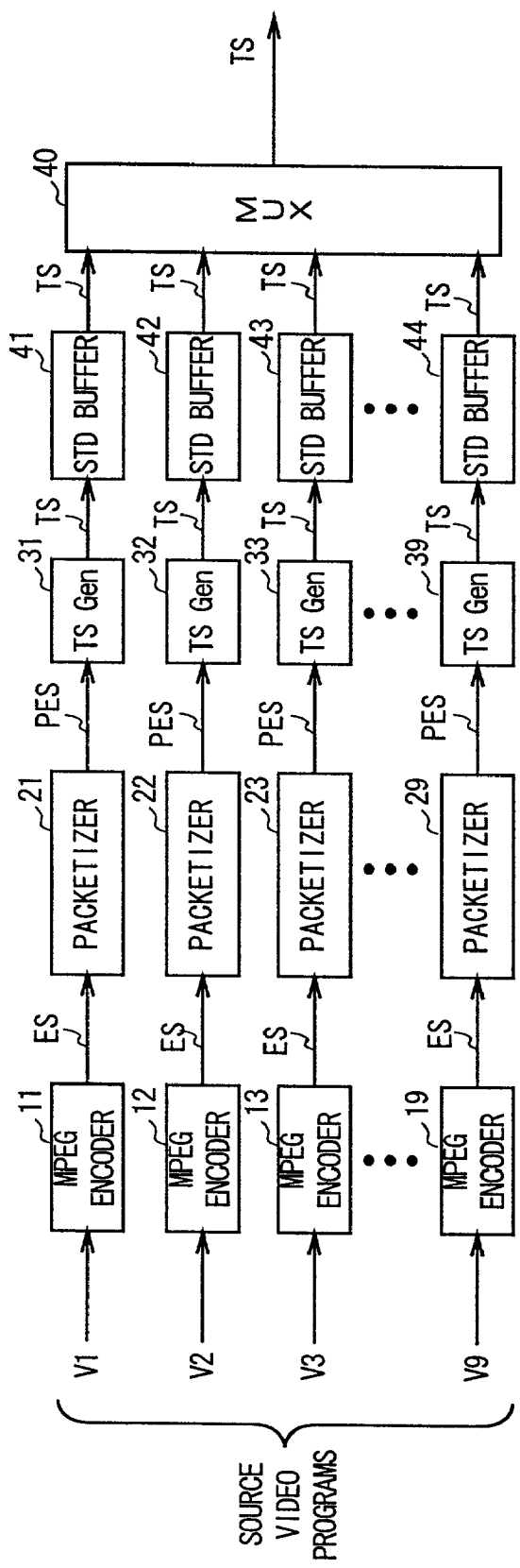
FIG. 1 is a block diagram showing the configuration of the multiplexing system in a system that comprises a conventional MPEG encoder and decoder.
Figure 2:
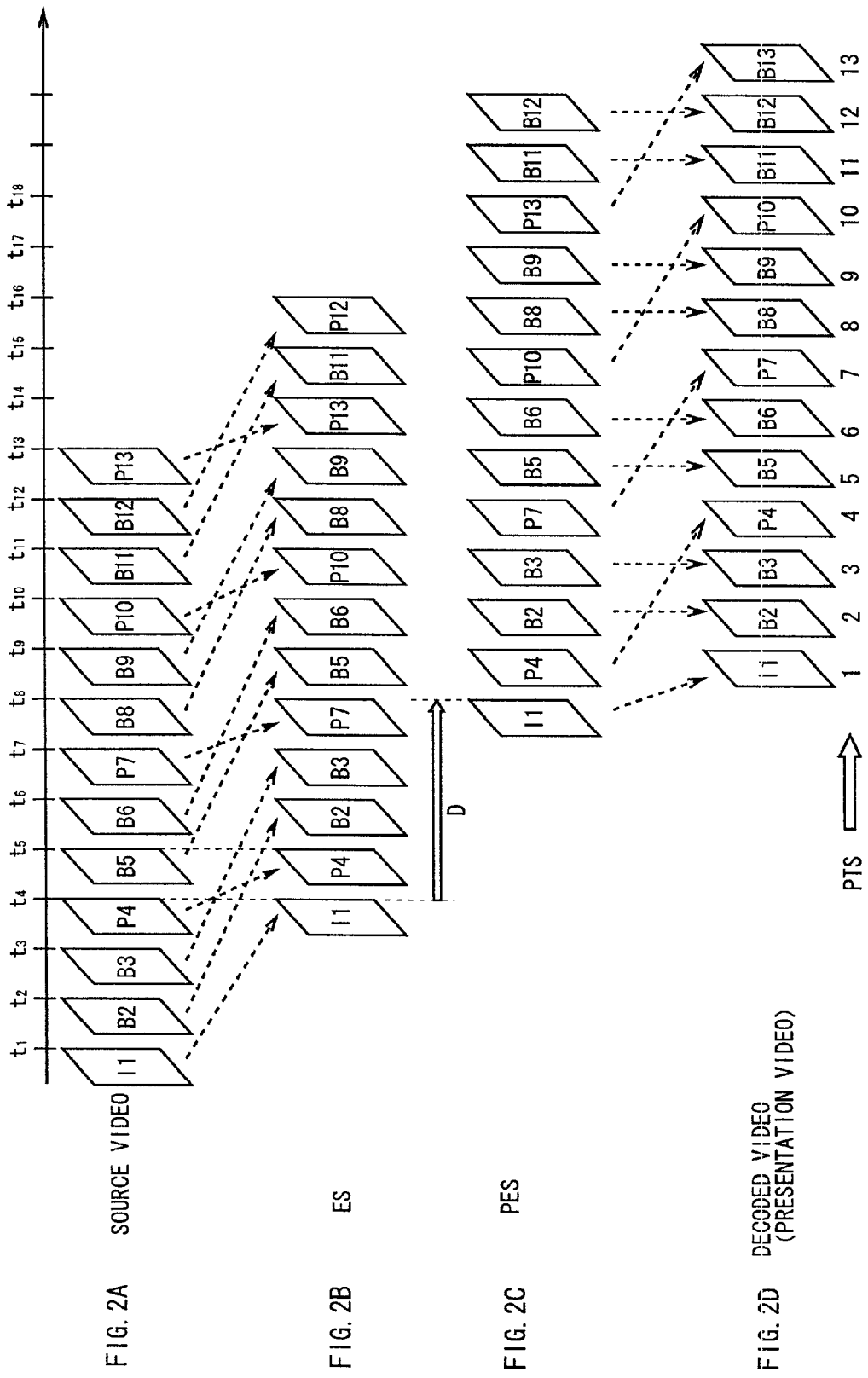
FIG. 2 is a schematic diagram showing the structure of each GOP.
Figure 3:
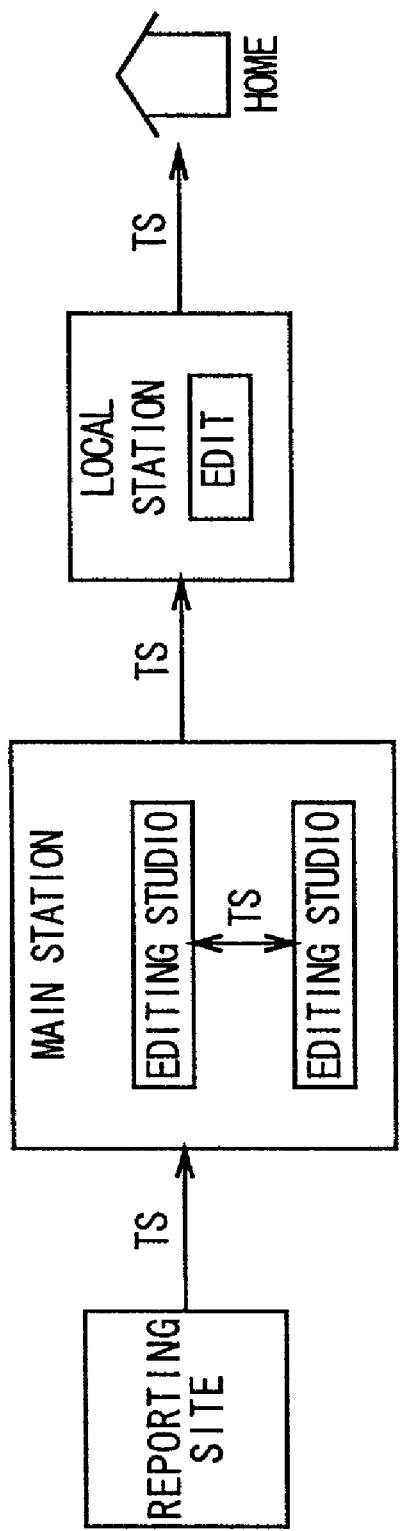
FIG. 3 is a schematic block diagram showing the flow of video data.

FIGS. 30A and 30B are almost the same as FIGS. 2A and 2B. However, as can be seen by comparing FIG. 2C and FIG. 30C, conventional methods generate a packetized elementary stream that determines PTS. Thus, as described earlier, if the number of B-pictures existing between an I-picture and P-pictures is denoted as N, there is a delay of (N+2) frames in the PTS determination process.

The encoding method and packetizing method of this embodiment can limit the delay produced in the process of determining PTS from an encoded stream, to one frame time. Furthermore, regardless of the number of B-pictures existing between an I-picture and I-pictures, the delay can be kept to the minimum delay of one frame. Besides, when designing a 9-channel packetizer such as the one shown in FIG. 27, this embodiment has an extremely great advantage of allowing to implement such a packetizer with nine frame memories.

Figure 31:
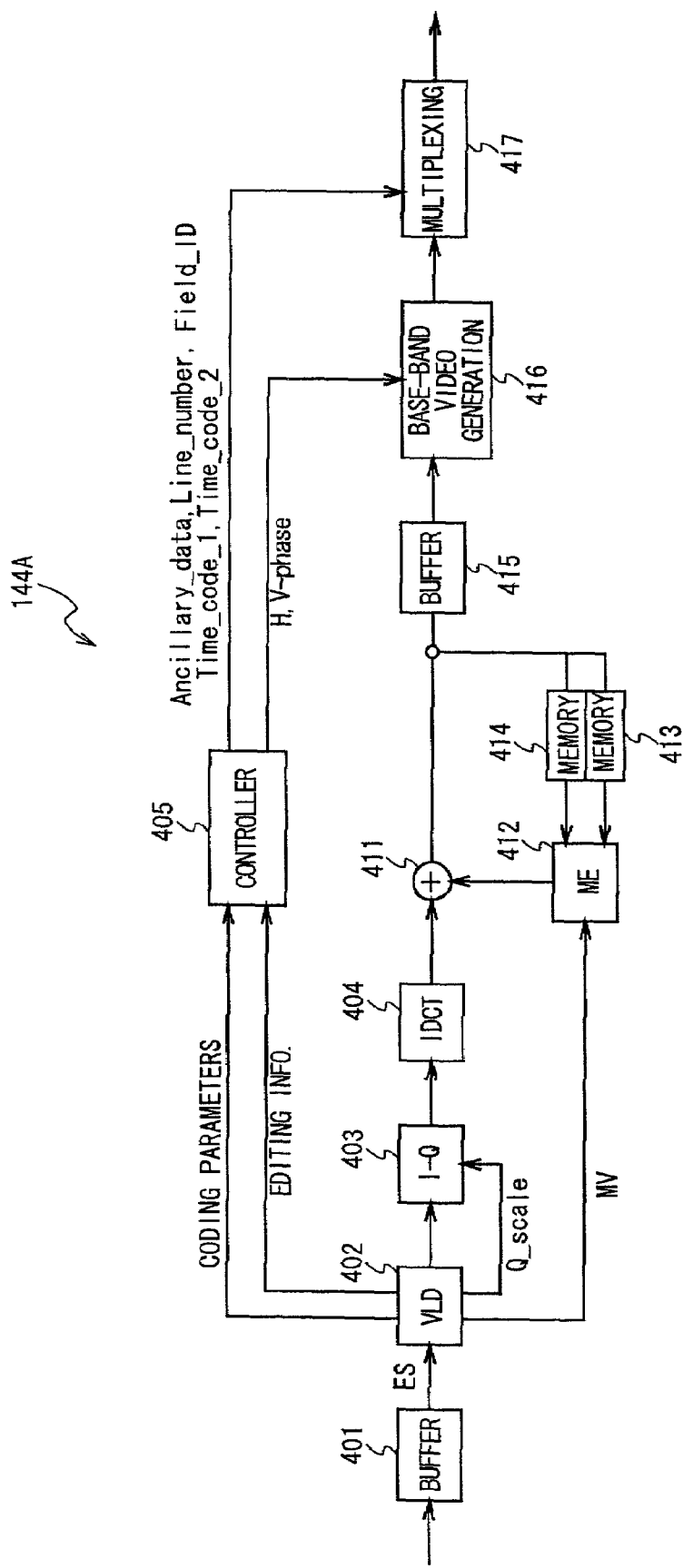
FIG. 31 is a block diagram showing the configuration of an MPEG decoder.

Now the MPEG decoders 144A to 144D will be described with reference to FIG. 31. Each of the MPEG decoders comprises a receive buffer 401, a variable-length decoding circuit 402, an inverse quantizing circuit 403, an inverse DCT circuit 404, a controller 405, an arithmetic unit 411, a motion compensating circuit 412, memories 413 and 414, a send buffer 415, a base-band video generation circuit 416, and a multiplexing circuit 417.

The variable-length decoding circuit 402 receives an elementary stream from the receive buffer and performs a variable-length decoding operation on it to generate a stream consisting of data elements with a predetermined data length. Then, the variable-length decoding circuit 402 parses the syntax of the data stream that has been subjected to variable-length decoding, thereby extracting all coding parameters from the data stream, and supplies them to the controller 405. Examples of the coding parameters that are required by the MPEG standard to be superimposed in the stream include picture type, motion vector, prediction mode, DCT mode, quantization scale code, quantization table information, etc. Basically, they are the parameters produced during the encoding process for generating the encoded stream.

A unique feature of this embodiment is that the variable-length decoding circuit 402 extracts the information described as MPEG_ES_Editing_information( ) in the user data area of elementary streams in addition to the coding parameters specified by the MPEG standard as described above. Specifically, information about V-phase( ) and H-phase( ) is described as MPEG_ES_Editing_information ( ) in the user data area in the sequence layer of encoded streams, and information about Time_code( ), Picture_order ( ), Ancillary_data( ), and History_data( ) is described as MPEG_ES_Editing_information( ) in the user data area in the picture layer of encoded streams. The variable-length encoding circuit 402 extracts the information about V-phase( ), H-phase( ), Time_code( ), Picture_order( ), Ancillary_data( ), and History_data( ) from the streams and supplies it to the controller 405.

The inverse quantizing circuit 403 inverse-quantizes the DCT coefficient data supplied by the variable-length decoding circuit 402 after variable-length decoding, based on the quantization scale supplied also by the variable-length decoding circuit 402 and supplies it to the inverse DCT circuit 404.

The inverse DCT circuit 404 performs an inverse DCT (discrete cosine transform) process on the quantized DCT coefficient supplied by the inverse quantizing circuit 403 and supplies it as image data subjected to inverse DCT to the arithmetic unit 411.

If the image data supplied to the arithmetic unit 411 by the inverse DCT circuit 404 is an I-picture, it is output from the arithmetic unit 411, supplied to the forward predictive picture section of the frame memory 414, and stored there for use to generate predictive picture data of the image data (P-picture or B-picture data) to be input later into the arithmetic unit 411.

If the image data supplied by the inverse DCT circuit 404 is P-picture data that uses the image data of the immediately preceding frame as predictive picture data and if it is data in forward prediction mode, the image data (I-picture data) of the immediately preceding frame is read out from the forward predictive picture section of the frame memory 414 and subjected to motion compensation in the motion compensating circuit 412 corresponding to the motion vector output from the variable-length decoding circuit 402. Then the P-picture data is output after the image data (differential data) supplied by the inverse DCT circuit 404 is added to it in the arithmetic unit 411. The sum data, i.e., the decoded P-picture is supplied to the backward predictive picture section of the frame memory 413, and stored there for use to generate predictive picture data of the image data (B-picture or P-picture data) to be input later into the arithmetic unit 411.

Intra-picture prediction mode data is not processed in the arithmetic unit 411 and stored as it is in the backward predictive picture section 413 as is the case with I-picture data even if it is P-picture data.

Since this P-picture is to be displayed after the B-picture that follows, it is not output to a format conversion circuit 32 at this time (as described above, the P-picture input later than the B-picture is processed and transmitted before the B-picture).

If the image data supplied by the inverse DCT circuit 404 is B-picture data, the image data of the I-picture stored in the forward predictive picture section of the frame memory 414 (in the case of forward prediction mode), image data of the P-picture stored in the backward predictive picture section 413 (in the case of backward prediction mode), or both image data (in the case of bidirectional backward prediction mode) are read out according to the prediction mode supplied from the variable-length decoding circuit 402. The image data is then subjected to motion compensation in the motion compensating circuit 412 according to the motion vector output from the variable-length decoding circuit 402, to generate a predictive picture. However, no predictive picture is generated if no motion compensation is necessary (in the case of intra-picture prediction mode).

The data that has thus been subjected to motion compensation by the motion compensating circuit 412 has the output from the inverse DCT circuit 404 added to it in the arithmetic unit 411. The sum output is supplied to the base-band video generation circuit 41E via the buffer 415. The video data output from this send buffer 415 contains only the video data for the active video area, but is not provided with ancillary data for the blanking interval or the like.

The controller 405 controls the operation of the circuits described above, based on the information about picture type, motion vector, prediction mode, DCT mode, quantization scale, quantization table information, and other coding parameters supplied by the variable-length decoding circuit 402.

Furthermore, the controller 405 controls the base-band video generation circuit 416, based on the V-phase and H-phase information supplied from the variable-length decoding circuit 402 as MPEG_ES_Editing_information( ). The V-phase extracted from the encoded stream represents the vertical position of the active video area in the full pixel area of the input video data while the H-phase represents the horizontal position of the active video area in the full pixel area of the input video data. Therefore, the controller 405 controls the base-band video generation circuit, in such a way that the decoded video data output from the buffer 415 will be mapped to the vertical and horizontal positions represented by V-phase and H-phase, on the full pixel area with the blanking image, or in such a way as to synthesize the decoded video data in the active area and blanking image in the full pixel area based on the vertical and horizontal positions represented by V-phase and H-phase. Consequently, the video data output from the base-band video generation circuit 416 has exactly the same blanking interval as the blanking interval in the input video data supplied to the MPEG encoder.

The controller 405 supplies Ancillary_data, Line_number, Field_ID, Time_code_1, and Time_code_2 extracted from the encoded stream or controls the multiplexing process of the multiplexing circuit 417 for Ancillary_data, Time_code_1, and Time_code_2, based on Field_ID. Specifically, as described with reference to FIG. 7C, since Field_ID is associated with Ancillary_data assigned to each field, the multiplexing circuit 417 superimposes Ancillary_data associated with Field_ID during the blanking interval identified by Field_ID. For example, if Field_ID is "2," it can be seen that this is the third field in the frame. Thus, in the encoded stream, Ancillary_data received as ancillary data associated with Field_ID of "2" is superimposed on the blanking interval of the third field with Field_ID of "2." When superimposing Ancillary_data on the blanking interval, the multiplexing circuit 417 superimposes Ancillary_data at the line number specified by Line_number transmitted with Ancillary_data.

Therefore, the video data output from the multiplexing circuit 417 has exactly the same ancillary data at exactly the same line number, in the active video area of exactly the same location, in exactly the same blanking interval as the input video data supplied to the MPEG encoder.

Thus, according to this embodiment, any MPEG encoding or decoding performed during the transmission of video data from the sending system to the receiving system will not cause the information inherent to the input video data or the ancillary data added to the input video data to be lost.

INDUSTRIAL APPLICABILITY

The present invention can be used at broadcasting stations and the like where video data is encoded and decoded frequently.

EXPLANATION OF REFERENCE NUMERALS

1 . . . Video processor, 2 . . . MPEG encoder, 3 . . . MPEG decoder, 5 . . . 3:2 pull-down process, 6 . . . 2:3 pull-down process, 104 . . . Controller, 105 . . . motion vector detector, 112 . . . DCT circuit, 113, . . . Quantizing circuit, 119 . . . Motion compensating circuit, 125 . . . Variable-length coding circuit, 126 . . . Send buffer, 142A . . . MPEG encoder, 300 . . . Multiplexing controller, 301, 302, 309 . . . Packetizers, 330 . . . Multiplexer.

The invention claimed is:

1. An encoding system for encoding input video data, comprising:
  input means for providing input video data exhibiting a particular frame frequency converted from a second frame frequency;
  counting means for counting fields in the input video data of said particular frame frequency to produce a count;
  converting means for converting the input video data having said particular frame frequency into video data with said second frame frequency;
  encoding means for encoding the converted video data to generate an elementary stream and including, in said elementary stream, picture order information about a picture order of said elementary stream; said encoding means generating said picture order information based on the fields counted in said counting means; said picture order information including a presentation time stamp count corresponding to the count of said counting means and a decoding time stamp count representing decoding times for the pictures of said elementary stream;

a packetizer for packetizing said elementary stream with said presentation and decoding time stamp counts;

extracting means for extracting from said input video data information representing number of lines corresponding to a vertical start position of an active video area and number of samples corresponding to a horizontal start position of said active video area; and supply means for supplying the extracted information to a controller thereby supplying unique information pertaining to V-phase and H-phase positioning of said active video area.

2. The encoding system according to claim 1, wherein said encoding means describes said picture order information in a picture layer of said elementary stream.

3. The encoding system according to claim 1, wherein said packetizer extracts said picture order information from said elementary stream by parsing the syntax of said elementary stream.

4. The encoding system according to claim 1, wherein said packetizer adds said presentation and decoding time stamp counts to a header of said packetized elementary stream.

5. The encoding system according to claim 1, wherein said particular frame frequency is a 30-Hz frame frequency generated by a 3:2 pull-down process performed on source video data with a second frame frequency of 24-Hz.

6. A method of encoding input video data, comprising the steps of:

providing input video data exhibiting a particular frame frequency converted from a second frame frequency;

counting fields in the input video data of said particular frame frequency to produce a count;

converting the input video data having said particular frame frequency into video data with said second frame frequency;

encoding, by an encoding unit, the converted video data to generate an elementary stream;

including, in said elementary stream, picture order information about a picture order of said elementary stream;

the encoding unit performing the further step of generating said picture order information based on the counted fields; said picture order information including a presentation time stamp count corresponding to the field count and a decoding time stamp count representing decoding times for the pictures of said elementary stream;

packetizing said elementary stream with said presentation and decoding time stamp counts;

extracting from said input video data information representing number of lines corresponding to a vertical start position of an active video area and number of samples corresponding to a horizontal start position of said active video area; and supplying the extracted information to a controller thereby supplying unique information pertaining to V-phase and H-phase positioning of said active video area.

* * * * *